INVENTORS
RICHARD C. KUDLICKI
ROLAND W. SMITH
BY
Wm. H. Dean

Feb. 14, 1967 R. C. KUDLICKI ET AL 3,303,764

PHOTO COMPOSING MACHINE

Filed Dec. 24, 1963 18 Sheets-Sheet 2

INVENTORS
RICHARD C. KUDLICKI
ROLAND W. SMITH

BY Wm. H. Dean

INVENTORS
RICHARD C. KUDLICKI
ROLAND W. SMITH
BY
Wm. H. Dean

PHOTO COMPOSING MACHINE

INVENTORS
RICHARD C. KUDLICKI
ROLAND W. SMITH
BY
Wm. H. Dean

PHOTO COMPOSING MACHINE

INVENTORS
RICHARD C. KUDLICKI
ROLAND W. SMITH
BY
Wm. H. Dean

Feb. 14, 1967 R. C. KUDLICKI ET AL 3,303,764
PHOTO COMPOSING MACHINE
Filed Dec. 24, 1963 18 Sheets-Sheet 6
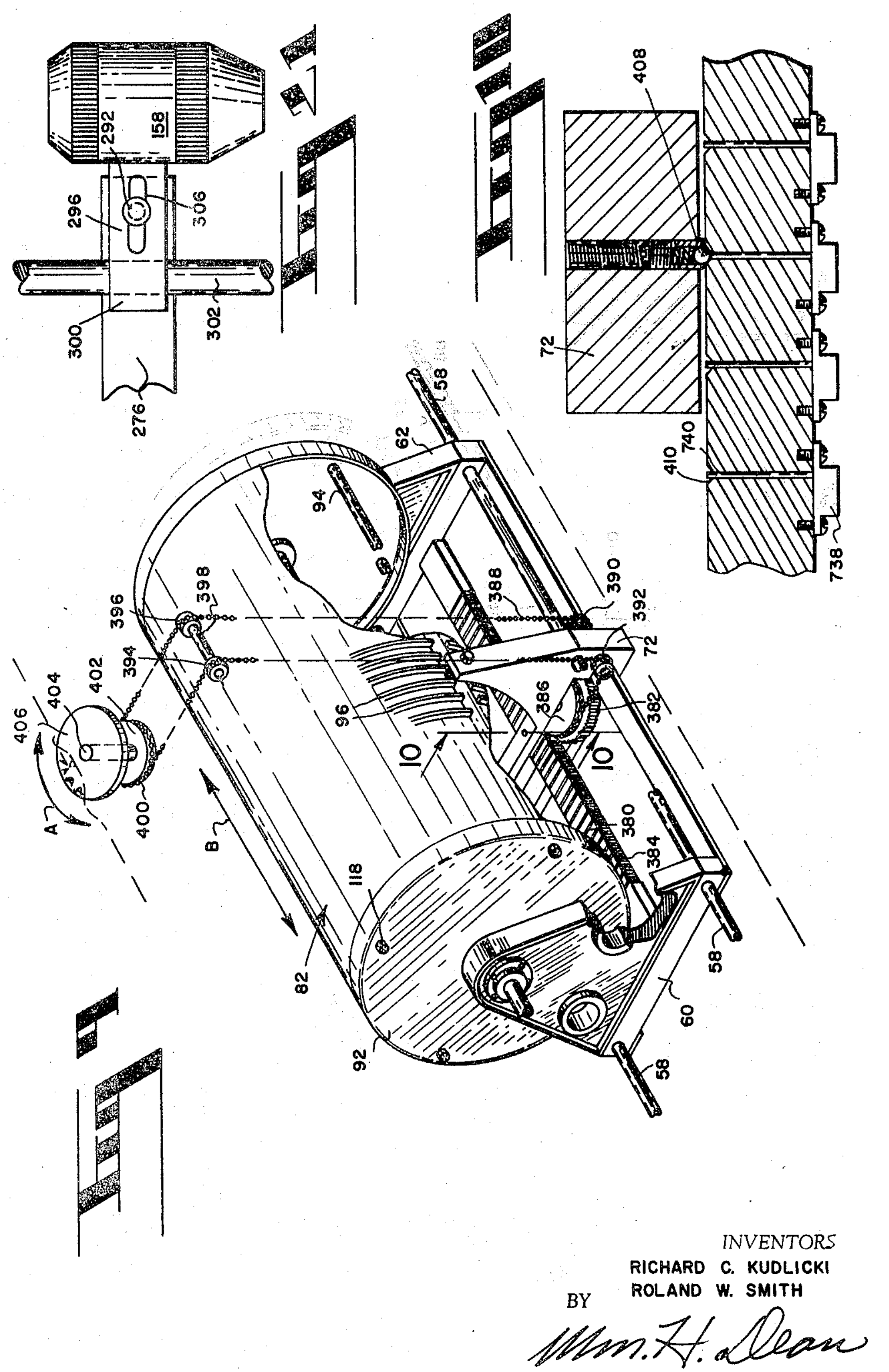
INVENTORS
RICHARD C. KUDLICKI
ROLAND W. SMITH
BY Wm. H. Dean

PHOTO COMPOSING MACHINE

Filed Dec. 24, 1963 18 Sheets-Sheet 7

INVENTORS
RICHARD C. KUDLICKI
ROLAND W. SMITH
BY
Wm. H. Dean

Feb. 14, 1967 R. C. KUDLICKI ET AL 3,303,764

PHOTO COMPOSING MACHINE

Filed Dec. 24, 1963 18 Sheets-Sheet 8

INVENTORS
RICHARD C. KUDLICKI
ROLAND W. SMITH
BY
Wm. H. Dean

INVENTORS
RICHARD C. KUDLICKI
ROLAND W. SMITH
BY
Wm. H. Dean

INVENTORS
RICHARD C. KUDLICKI
ROLAND W. SMITH
BY
Wm. H. Dean

INVENTORS
RICHARD C. KUDLICKI
ROLAND W. SMITH
BY
Wm. H. Dean

INVENTORS
RICHARD C. KUDLICKI
ROLAND W. SMITH
BY
Wm. H. Dean

Feb. 14, 1967 R. C. KUDLICKI ET AL 3,303,764

PHOTO COMPOSING MACHINE

Filed Dec. 24, 1963 18 Sheets-Sheet 13

INVENTORS
RICHARD C. KUDLICKI
ROLAND W. SMITH

BY

Wm. H. Dean

INVENTORS
RICHARD C. KUDLICKI
ROLAND W. SMITH
BY
Wm. H. Dean

*INVENTORS*
RICHARD C. KUDLICKI
ROLAND W. SMITH
BY Wm. H. Dean

Feb. 14, 1967 R. C. KUDLICKI ET AL 3,303,764

PHOTO COMPOSING MACHINE

Filed Dec. 24, 1963 18 Sheets-Sheet 16

INVENTORS
RICHARD C. KUDLICKI
ROLAND W. SMITH
BY
Wm. H. Dean

Feb. 14, 1967 R. C. KUDLICKI ET AL 3,303,764

PHOTO COMPOSING MACHINE

Filed Dec. 24, 1963 18 Sheets-Sheet 17

INVENTORS
RICHARD C. KUDLICKI
ROLAND W. SMITH

BY Wm. H. Dean

Feb. 14, 1967 R. C. KUDLICKI ET AL 3,303,764

PHOTO COMPOSING MACHINE

Filed Dec. 24, 1963 18 Sheets-Sheet 18

INVENTORS
RICHARD C. KUDLICKI
ROLAND W. SMITH

BY Wm. H. Dean

United States Patent Office 3,303,764
Patented Feb. 14, 1967

3,303,764
PHOTO COMPOSING MACHINE

Richard C. Kudlicki and Roland W. Smith, Phoenix, Ariz., assignors of fifty percent to Richard C. Kudlicki and fifty percent to Max A. Wojton, both of Phoenix, Ariz.

Filed Dec. 24, 1963, Ser. No. 333,035
16 Claims. (Cl. 95—4.5)

This invention relates to a photo composing machine and, more particularly, to a photo composing machine for use in photographically producing facsimiles of printed subject matter to be produced.

Various photo composing machines are in use for producing film on which facsimiles of print are photographically developed. However, such machines generally require considerable manual labor in their operation and lack versatility in operation.

Prior art photo composing machines require manual attention to the spacing of type exposures on film as well as to the adaptation of the machine to produce various styles of photographically produced type facsimiles.

Many prior art machines require a degree of disassembly and reassembly for adapting them to a change in the style of lettering or font to be reproduced.

Various prior art machines also require special setups and manual adjustments to coordinate various functions of photo composing machines with relation to enlargement, justification, bad character combinations, and various fonts, and coordination thereof with film advancement to accomplish proper spacing of the various exposures on the film so that these exposures may coincide with the required spacing of various letters, one from the other. Further, much time has been lost in the operation of prior art machines due to a lack of facilities for indexing letter templates with respect to photographic exposure devices so that all letters of the alphabet and various numerals and characters may be readily and quickly exposed in proper sequence to produce facsimiles of subject matter.

Accordingly, it is an object of the present invention to provide a photo composing machine having a novel combination of rotary character support and exposure rings together with automatic film advancing mechanism which is actuated by means on each ring to advance the film precisely a given distance in relation to the required spacing of various letters of material being produced as the various letters are exposed from the rings of the invention, to the film, in proper sequence.

Another object of the invention is to provide a very simple and reliable mechanism providing optional usage of a great variety of type or fonts of type with a very simple means of selecting and indexing such type in position for photographic exposure and production of type facsimiles.

Another object of the invention is to provide a photo composing machine having a plurality of transparent/translucent rings arranged in an assembly and in axial alignment with each other to form a drum; each ring having a different style of characters or font which may be illuminated from the interior of the drum so that means exteriorly of the drum may photographically transmit the illuminated characters to photosensitive film and thereby means stationarily mounted internally of each annular ring portion engages notches therein; each notch being of a depth corresponding with a character on the drum being exposed to said illumination and whereby means engageable with the notch provides a control function for a film advancing mechanism which advances film a distance according to the respective notch and the required spacing of each individual character being exposed so that a plurality of successive characters photographically reproduced on said film will be in proper spaced position for producing copy.

Another object of the invention is to provide a photo composing machine having a novel means for rotatably indexing an annular drum with characters on the periphery thereof, whereby various characters of the alphabet or numerical characters may be quickly indexed with a light source and lens system for photographically producing type facsimiles.

Another object of the invention is to provide a photo composing machine having novel means for automatically advancing photosensitive film with relation to a fixed exposure axis, wherein a lens system and light source is disposed to optically expose the film to various characters or numerals on a rotatable and axially movable drum having axially spaced annular font or character holding bands thereon.

Another object of the invention is to provide a photo composing machine having a novel means for advancing film in relation to characters to which the film is exposed, said advancing mechanism being cooperable with photographic means whereby the film advancing mechanism advances the film a distance in proportion to the degree of optical enlargement or magnification afforded by the enlarging system of the machine.

Another object of the invention is to provide a photo composing machine having a novel assembly of character supporting rings having different styles of type thereon, together with means for moving any one of said rings and indexing it relative to a stationary light source and film advance mechanism supported by a central shaft internally of the assembly of rings.

Another object of the invention is to provide a photo composing machine having a multiple font carrying rotatable drum mounted on a concentric assembly of shafts one of which is stationary and supporting a light source; a second shaft rotatably mounted about the stationary shaft and carrying an actuating cam projectable into notch means of the drum; said notch means corresponding with individual characters on the drum, and the rotatable means being coupled with a film advancing mechanism for proportional advancement of the film relative to the light source in accordance with the required spacing of such characters in the production of subject matter employing type facsimiles photographically produced.

Another object of the invention is to provide a photo composing machine having a rotary drum rotatable about its axis and movable longitudinally of its axis, and having several font or type supporting bands thereon, any one of which is exposable to a light source and an optical system, and wherein novel means is provided for rotating the drum automatically to pre-selected positions by operation of keys on a console, and also wherein rotation of the drum and operation of the keys automatically advances film to be exposed to the characters by the light source in such a manner that compensation is made for optical magnification, the type or font style, bad character combinations, and/or manual justification which may be fed into the automatic controls by operation of equipment on the console of the machine.

Another object of the invention is to provide a photo composing machine having a novel rotatable drum assembly having annular bands of exposable type or font; said drum being movable longitudinally of its axis to align any one of said bands with a light source and an optical system. And the invention comprising novel electrical and electronic circuitry for rotating the drum for the selection of characters and for advancing film relative to the optical system, all of which is operable in a very simple and accurate manner from keyboard controls of a console of the machine.

Another object of the invention is to provide a photo composing machine having novel means for exposing film, cutting off exposed lengths of film, and developing the exposed film.

Another object of the invention is to provide a photo composing machine having novel means for exposing film; for reversing the film longitudinally of itself, and for moving the film laterally and subsequently advancing it consecutively to produce superimposed lines of type copy on the film.

FIGURE 9 is an enlarged perspective view showing the character drum assembly of the invention and manual means for actuating the drum assembly relative to a stationary light source whereby various sections of the drum may be indexing with the light source;

FIGURE 10 is an enlarged fragmentary sectional view taken from the line 10—10 of FIGURE 9 showing indexing means for holding the drum assembly precisely in certain positions to align various annular portions thereof with a light source;

FIGURE 20 is an enlarged fragmentary sectional view taken from the line 20—20 of FIGURE 2;

FIGURE 21 is an enlarged fragmentary sectional view taken from the line 21—21 of FIGURE 19;

FIGURE 33 is a diagrammatic view of the electrical wiring and circuitry together with related mechanisms of the invention providing a digital film positioning means for controlling the advancement of film in accordance with spacing requirements of various characters to be reproduced on the film;

FIGURE 34 is a view similar to FIGURE 33, but showing a modification of the control system shown in FIGURE 33; FIGURE 34 thus showing an analogue film positioning system as contrasted with the digital film positioning system shown in FIGURE 33.

Figure 1:
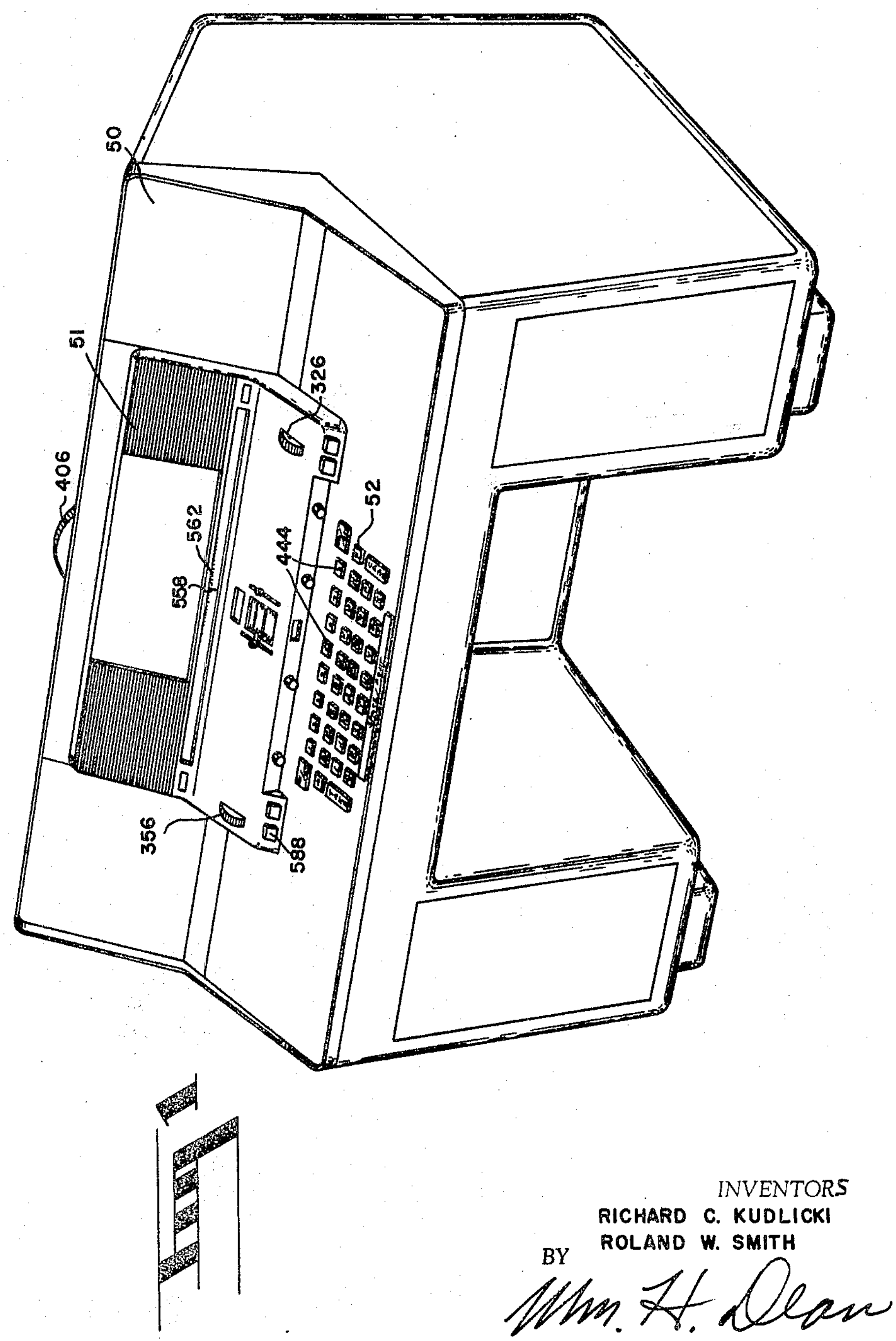
FIGURE 1 is a perspective view of the cabinet of a photo composing machine in accordance with the present invention and showing the keyboard and controls for the machine.

As shown in FIGURE 1 of the drawings, the photo composing machine of the present invention is provided with a cabinet 50 having a keyboard 52 provided with suitable manual controls for the machine, as will hereinafter be described in detail.

Figure 2:
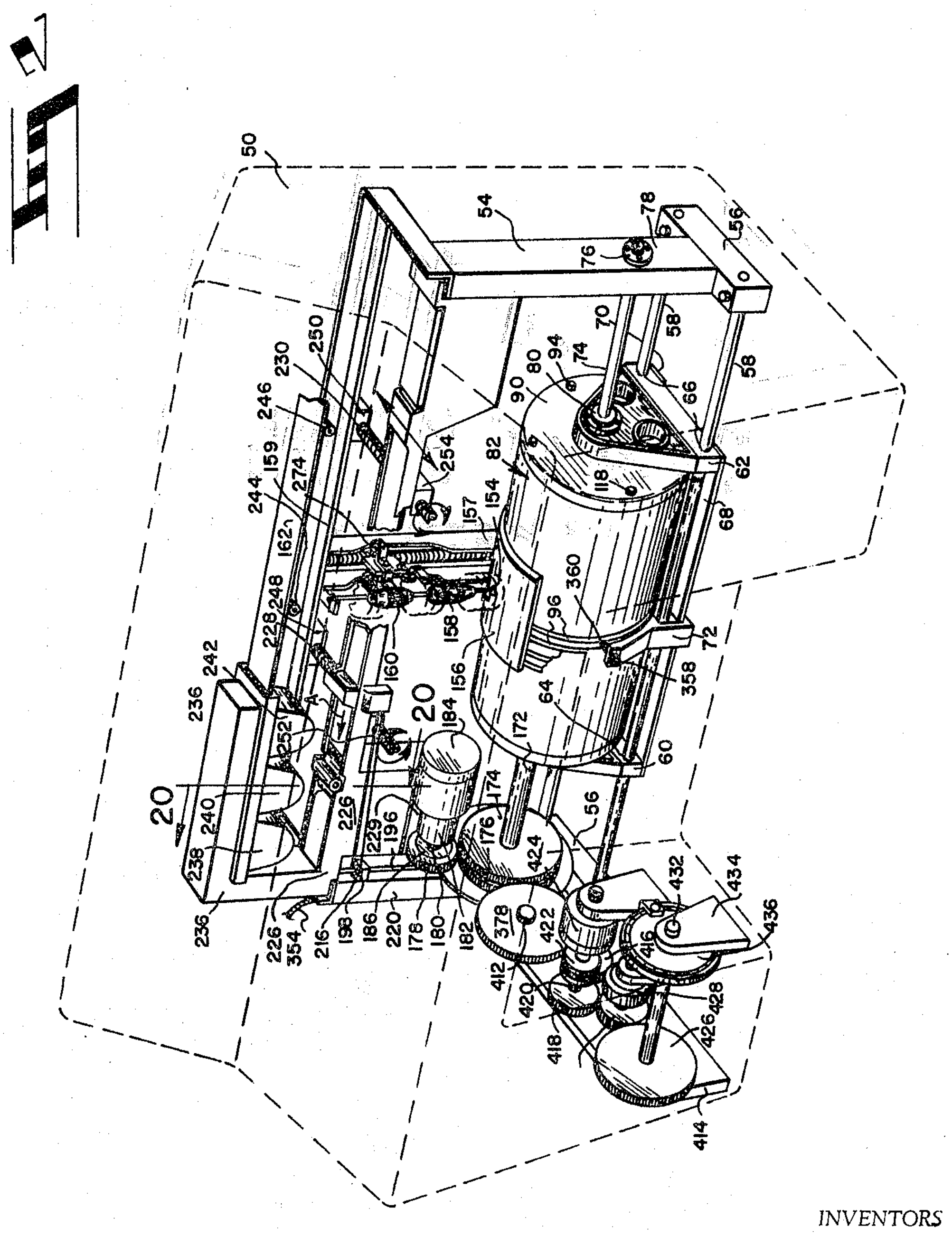
FIGURE 2 is a perspective view similar to FIGURE 1 showing the cabinet of the machine in broken lines and showing the internal operating structure of the machine in the assembly.

Inside this cabinet 50 is the mechanism and electric equipment of the invention as shown generally in FIGURE 2 of the drawings.

The mechanism of the machine includes a frame 54 having a base section 56 at each end thereof. Between these base sections 56 are secured traverse rods 58, which provide supports upon which a drum assembly of the machine is slidably movable, as will be hereinafter described in detail.

The drum assembly is provided with slide bearing frames 60 and 62 at opposite ends thereof. These frames 60 and 62 are provided with bearing openings 64 and 66 respectively, which are slidable on the traverse rods 58.

Bars 68 and 70 interconnect the slide bearing frames 60 and 62 below the traverse rods 58.

Connected to the bar 68 is an index bracket 72, details of which will hereinafter be described.

Disposed in an intermediate position above the traverse rods 58 is a stationary shaft 74 having a fixture 76 secured thereto; said fixture 76 being secured stationarily to an upright 78 of the frame 54.

The slide bearing frame 62 is provided with a slide 80 which is axially mounted on the stationary shaft 74 to support the drum assembly 82 concentrically thereon, as will be hereinafter described in detail.

Figures 6, 7, 8:
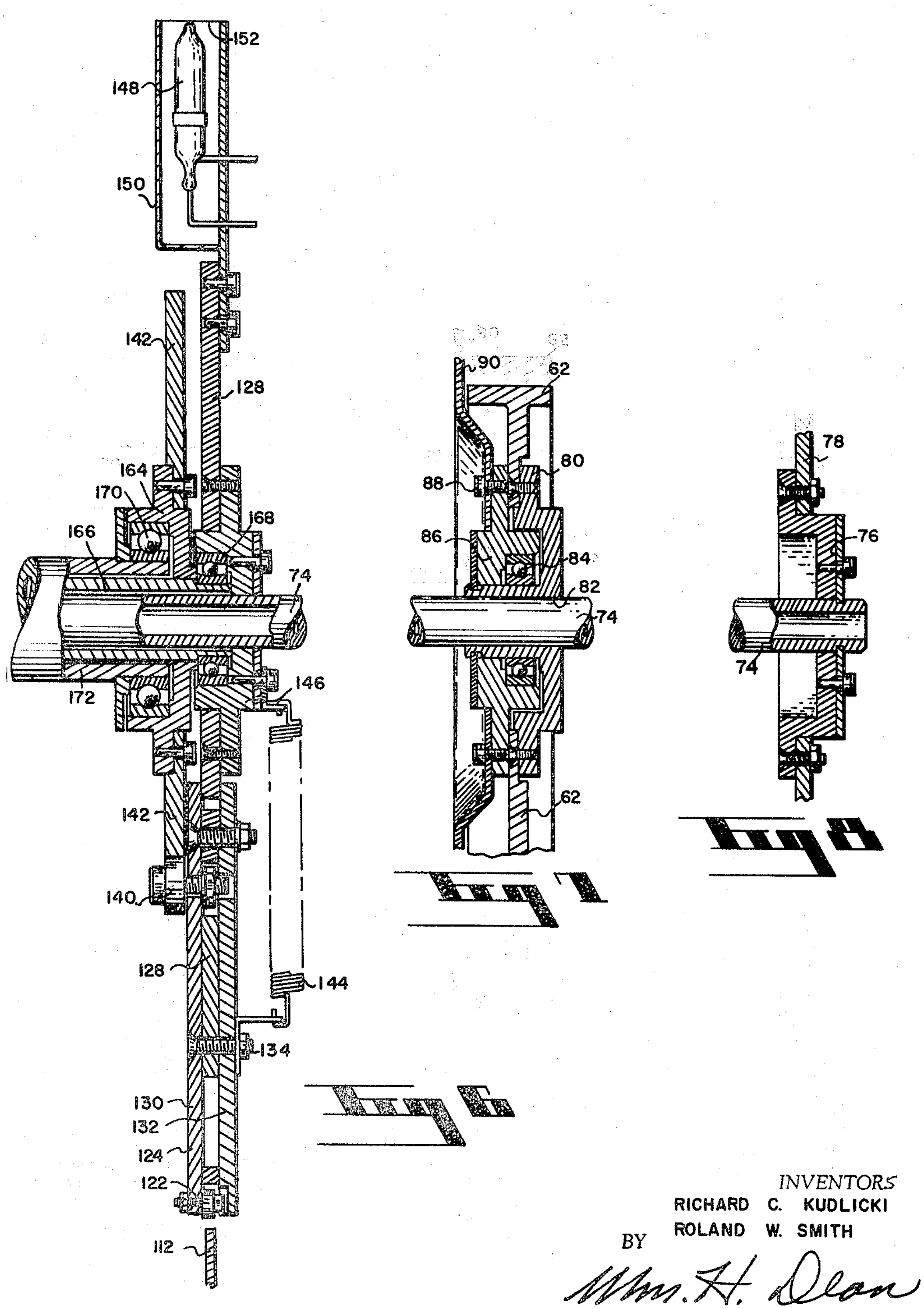
FIGURE 6 is an enlarged fragmentary sectional view taken from the line 6—6 of FIGURE 3.
FIGURE 7 is an enlarged fragmentary sectional view taken from the line 7—7 of FIGURE 3.
FIGURE 8 is an enlarged fragmentary sectional view taken from the line 8—8 of FIGURE 3.

Referring to FIGURE 8 of the drawings, it will be seen that the upright 78 of the frame 54 carries the fixture 76 hereinbefore described to which the shaft 74 is fixed against rotation relative to the frame 54 so that this shaft 74 is prevented from rotating relative to the frame.

The slide bearing 80, as shown in FIGURE 7 of the drawings, is provided with an internal bore 82 slidable on the shaft 74 axially thereof. The member 80 externally of the bore 82 supports a bearing 84 on which a collar 86 is mounted. This collar 86 is thus rotatably supported on the slide bearing 80 by means of the bearing 84.

Secured by bolts 88 to the collar 86 is an end member 90 of the drum assembly 82.

Figures 3, 17:
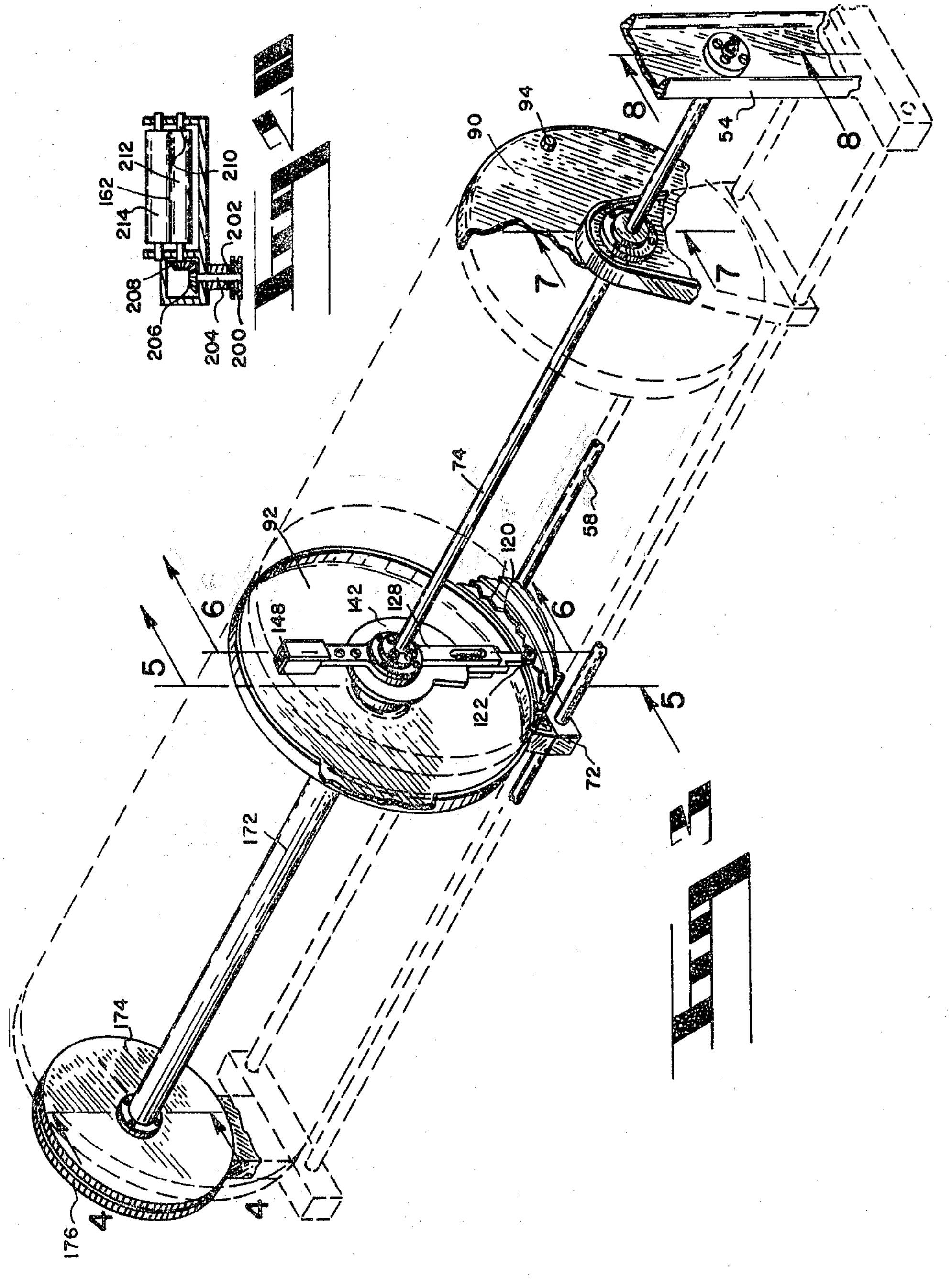
FIGURE 3 is an enlarged perspective view of the type character drum assembly spacing actuator mechanism and illuminating equipment showing portions of the structure broken away and in section to amplify the illustration.
FIGURE 17 is a fragmentary perspective view showing a variable magnification optical system disposed between the character support holding drum assembly of the invention and film on which characters are projected from the drum through said optical system of the invention.

This end member 90 is a generally circular pan-shaped structure, as shown best in FIGURES 2 and 3 of the drawings.

A similar end member 92 is disposed at the opposite end of the drum assembly from the end member 90 and this member 92 is generally a circular pan-shaped structure, as shown best in FIGURES 2 and 3 of the drawings. Rods 94 interconnect the end members 90 and 92 and clamp a plurality of drum or ring sections therebetween to form drum assembly 82, as will hereinafter be described.

Figures 14, 15, 16:
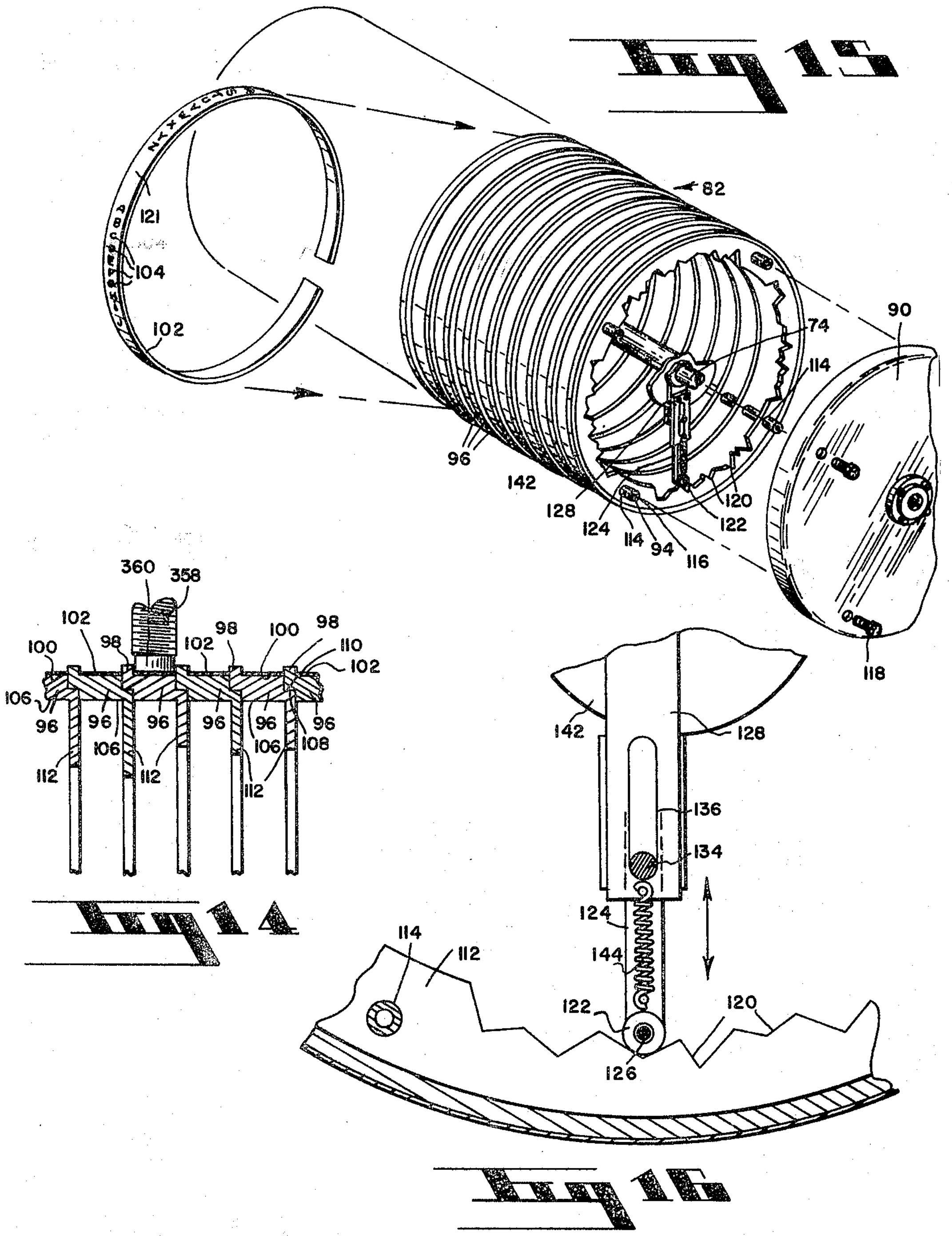
FIGURE 14 is a fragmentary sectional view taken from line 14—14 of FIGURE 12.
FIGURE 15 is an exploded perspective view of elements of the drum assembly of the invention showing one of the letter character bands or character support removed from one of the drum sections and illustrating film spacer mechanism in connection with one of the sections of the drum assembly.
FIGURE 16 is an enlarged fragmentary view showing portions of the mechanism disclosed in FIGURE 15, which mechanisms are responsible for spacing film in accordance with the required spacing between various letters so that the letters will be variably spaced in their exposed relation to photographic film; said film being driven by means responsive to the mechanism shown in FIGURE 16.
Figure 17:
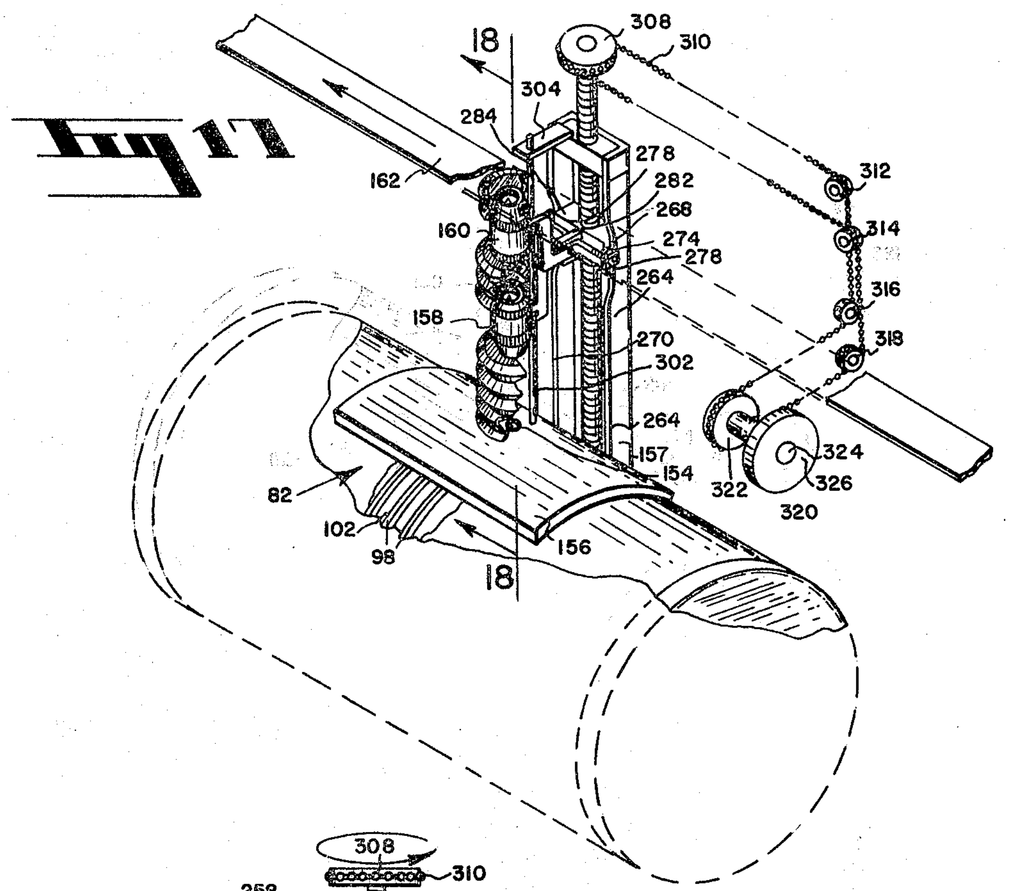

These drum sections generally designated 96 are shown in cross-section in FIGURE 14 of the drawings.

These drum sections are concentrically nested together in an assembly so that a great number of these drum sections may provide for a wide selection of letter character styles or font types, as will hereinafter be described.

Each drum section 96 is provided with an external annular rib portion 98 and an adjacent annular surface 100 which supports a thin transparent or translucent band 102 having letter characters which are preferably opaque, designated 104 in FIGURE 15 of the drawings. These letter characters 104 printed or otherwise affixed to the bands 102 may be in various styles and may also be accompanied by numeral designations on the bands or any other desired indicia which may be used in printed matter.

The bands 102 are thus secured on the annular surfaces 100 of the drum sections 96, and these drum sections 96 are preferably made of Lucite or other transparent or translucent light transmitting material which will permit the passage of the light from internal surfaces 106 through the bands 102 and to project images of the characters 104 onto photosensitive film, as will hereinafter be described.

Each drum section 96 is provided with an annular reduced diameter ledge portion 108, which is of a diameter slightly larger than the internal diameter 106, and each of these ledge portions 108 nests in a conforming and surrounding recess 110 of the axially adjacent drum section 96, thus, these drum sections 96 are axially nested and concentrically located relative to each other and each annular rib 98 provides a radially extending portion extending beyond the respective annular surface of each drum 96 so that the bands 102 are located between the ribs 98 of adjacent drum sections 106.

Each drum section 96 is provided with an inwardly extending generally annular flange 112 which extends radially inwardly relative to each respective surface 106.

These flanges 112 are each provided with openings 114, as shown in FIGURE 15, through which the rods 94 extend. These rods 94 are provided with internally screw threaded ends 116 into which cap screws 118 are screw threaded to secure the end members 90 and 92 together with the rods 94. It will, therefore, be appreciated that all of the drum sections 96 are held together by the rods 94 and cap screws 118 and that the end plates 90 and 92 hold all of the drum sections 96 in axially nested relation to each other as disclosed in FIGURE 14 of the drawings.

Each flange 112 of each drum section 96 is provided with a plurality of notch portions 120, as shown in FIGURE 16, and these notch portions extend between openings 114 through which the rods 94 are disposed, thus, the notches 120 are interrupted with relation to the areas through which the rods 94 extend, and, likewise, the bands 102 are provided with corresponding blank areas 121 disposed outwardly of the rods 94 for reasons which will be hereinafter described in detail.

The notches 120 vary in depth in proportion to the required spacing for various letters 104 to be photographically reproduced on film, as will be hereinafter described.

As shown in FIGURES 3 and 16, the notches 120 are individually engageable by a small roller 122 rotatably mounted on a slide bar 124 by means of a pin 126. The slide bar 124 is mounted on a mount member 128 fixed to the shaft 74, all as shown best in FIGURES 3, 15 and 16 of the drawings.

Referring to FIGURE 6 of the drawings, it will be seen that the slide bar 124 comprises a pair of bar members 130 and 132 which are disposed on opposite sides of the mount plate 128 and pins 134 interconnect the plates 130 and 132 and extend through slots 136 vertically disposed in the mount plate 128. Thus, the slide bar 124 and the roller 122 are vertically slidably mounted with relation to the mount plate 128.

Mounted on the plate 132 is a roller 140 engageable by a cam 142 for projecting the slide bar 124 and roller 122 downwardly into engagement with the notches 120, as will be hereinafter described.

A spring 144 is connected to the slide bar 124 by means of one of the bolts 134 and this spring 144 at its opposite end is connected to a hub fixture 146 to which the mount plate 128 is attached. This fixture 146 is fixed to the shaft 74 which in turn is stationarily fixed to the frame 54, as hereinbefore described.

The spring 144 tends to retract the slide bar 124 upwardly when the cam 142 is rotated to permit the roller 140 to pass upwardly, as will be hereinafter described in detail.

The stationary mounted plate 128 supports a lamp 148 and an enclosure 150 disposed therearound. This enclosure 150 is provided with an upper open end 152 from which light may be emitted upwardly from the lamp 148 toward the inner surface 106 of one of the drum sections 96.

The lamp 148 is thus disposed to cast light through one of the drum sections 96 and through a respective band 102 in order to cast a reflection or image of one of the characters 104 upwardly through an opening 154, as shown in FIGURE 17, in a shield 156 mounted stationarily on a frame section 157 extending downwardly from a horizontal portion 159 of the frame 54.

Mounted directly above the opening 154, and in axial alignment therewith, are lenses 158 and 160 which are arranged to provide for optical enlargements of the illuminated outline or shadow or image of each character 104. These lenses 158 and 160 being directed in alignment with a photosensitive film 162. The movement, handling and development of which will be hereinafter described in detail.

It will be seen that the notch engaging roller 122, hereinbefore described, is disposed in diametrically opposed relationship to the lamp 148 within the drum assembly 82, and that the roller 122 engages a notch 120, which is respective to one of the characters 104, directly aligned with the opening 154 and the lenses 158 and 160. Thus, operation of the cam 142, when projecting the roller 122 into the respective notches 120, operates to predetermine the required spacing of the film 162 relative to the character 104 being exposed to light from the lamp 148 directly and diametrically above the roller 122.

The cam 142 in engagement with the roller 140 is mounted to actuate the roller 122 radially a given distance, as limited by a respective notch 120 and rotation of this cam 142 controls the amount of linear advance of the film 162. It will be appreciated that the rotational degree of the cam 142 is limited by the extension of the slide bar 124 and the ultimate engagement of the roller 122 with one of the notches 120. The external surface of the cam 142 which engages the roller 140 is a spiral type cam, as shown in FIGURES 3 and 15.

This cam 142 is fixed to a hub 164, as shown best in FIGURE 6 of the drawings. This hub 164 is fixed to a hollow shaft 166 which surrounds the stationary shaft 74. An end of the hollow shaft 166 is concentrically supported by a bearing 168 which surrounds the hollow shaft 166 and is carried internally on the hub 146 on which mount plate 128 is stationarily mounted.

The hub 164 being fixed to the shaft 166 also provides an external support for the periphery of a bearing 170 which surrounds a second hollow shaft 172. This hollow shaft 172 surrounds the shaft 166, all as shown in FIGURE 6 of the drawings the shaft 172 being disposed to rotatably drive the drum assembly 82, as will be hereinafter described in detail.

Figure 4:
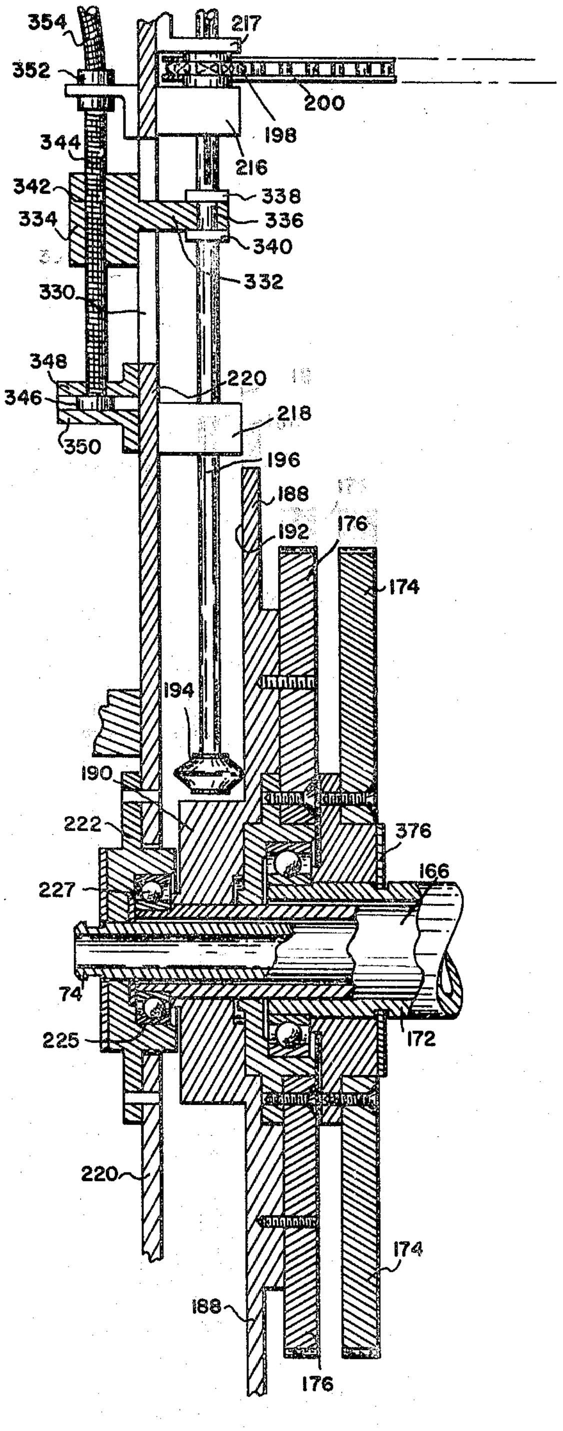
FIGURE 4 is an enlarged fragmentary sectional view taken from the line 4—4 of FIGURE 3.

As shown in FIGURES 2 and 4 of the drawings, the shaft 172 is fixed to a drive gear 174, and another drive gear 176 is fixed to the shaft 166 in adjacent relation to the gear 174.

The gear 176 meshes with a drive gear 178, carried by a shaft 180, extending from a housing 182, coupled to a motor 184. The motor 184 is disposed to drive the shaft 166 and the cam 142. The motor 184 in its extended housing 182 is provided with a spring return overrunning clutch, which drives the shaft 180 and gear 178 in one direction, thus driving the shaft 166 and the cam 142 in one direction. The shaft 180 is provided with a slip clutch 186 so that the gear 178 will be driven until the roller 122 reaches the bottom of one of the notches 120, then the clutch will slip until the motor 184 is deenergized, all of which will be hereinafter described. When the motor is de-energized the spring return mechanism engaged with the shaft 180 will tend to move it backward in reverse direction from that at which it is driven by the motor 184. This will reverse the directional movement of the cam 142 and permit retraction of the roller 122 by the spring 144 when the film 162 has been advanced in accordance with the contact of the roller 122 and the degree to which the cam 142 is turned by the motor 184.

It will be appreciated that the degree of rotation to which the cam 142 is permitted to turn is controlled by the depth of each notch 120 below the roller 122, diametrically opposed to a respective character 104 being exposed to the lenses 158 and 160 to the film 162.

According to one version of the invention the film 162 is concurrently driven by the motor 184 when the cam 142 is driven to a position at which the roller 122 engages a respective notch 120. This film driving mechanism includes a drive plate 188 shown in FIGURE 4 of the drawings. This drive plate is secured to the gear 176 which, as hereinbefore described, is secured to the shaft 166. It will be seen that the plate 188 and gear 176 are secured to annular hub 190 which is fixed to the periphery of the shaft 166 so that the plate 188 and the gear 176 and shaft 166 are driven in unison when the motor 184 is operated as hereinbefore described.

The plate 188 is provided with a drive surface 192 engaged by a film driving roller 194 carried on a shaft 196 on which a sprocket 198 is mounted. This sprocket 198 drives a chain 200 which, as shown in FIGURE 20, also extends over another sprocket 202 secured to a shaft 204 carrying a mitre gear 206 in mesh with another mitre gear 208 which is secured to a shaft 210 of a film driving roller 212. The film 162 is engaged by the film driving roller 212 in opposed relation to another film driving roller 214 and these rollers are spaced closely enough to frictionally engage the film 162 and these rollers may be spring loaded slightly together so that the roller 212 driven as hereinbefore described will advance the film in a direction of an arrow A, as shown in FIGURE 2 of the drawings.

It will be seen that the shaft 196 is mounted in bearings 216 and 218, and that the shaft 196 may rotate in these bearings and may also slide axially in these bearings for operating in coordination with the optical enlarging system, which includes the movable lenses 158 and 160.

The bearings 216 and 218 are carried on a vertical section 220 of the frame 54.

A film carriage frame 226 is adjustably movable horizontally and carried by lead screws 228 and 230. Accordingly, the frame 226 may be adjusted laterally relative to the longitudinal axis of the film 162 and laterally of the axes of the lenses 158 and 160 for the photographic printing of superimposed lines of print thereon, as will be hereinafter described.

In order to permit movement of the film carriage frame 226 laterally of the axis of the shaft 196 the chain 200 may have sufficient slack to accommodate this movement or it may be provided with a spring loaded idler roller, if desired.

It will be appreciated by those skilled in the art that the rotation of the cam 142, as hereinbefore described, may be limited to a given degree of rotation around the axis of the shaft 166, depending upon the depth of the respective notch 120 into which the roller 122 may be projected. During the rotation of the shaft 166 the drive plate 188 at its surface 192 engages the periphery of the roller 194 and drives the shaft 196 together with the sprocket 198 and chain 200 which engages the sprocket 202 driving the mitred gears 206 and 208 and the film drive roller 212. Accordingly, the film 162 is thus advanced in the direction of the arrow A a distance equal to the spacing required for the particular letter or numerical character 104 being exposed through the lenses 158 and 160 to the film 162 when the lamp 148 illuminates this letter, which is diametrically opposed to the roller 122, hereinbefore described.

As shown in FIGURE 4 of the drawings, the roller 194 operates adjacent to the upstanding frame portion 220 of the frame 54, said frame portion 220 being similar to the hereinbefore described upstanding portion 78. A shaft supporting fixture 222 is bolted to the frame portion 220, and the shaft 74 is secured in fixed relation to this fixture 222.

The fixture 222 is provided with a recess 225 holding a bearing 227 which supports one end of the hollow shaft 166 opposite to the support provided by the bearing 168, hereinbefore described and shown in FIGURE 6 of the drawings.

A bracket 228 extending from the upstanding frame member 220 supports the motor 184.

As shown in FIGURE 2 of the drawings, the film carriage frame 226 is provided with an upwardly extending portion 236 having a horizontally disposed processing tank support 236 which supports the processing tanks 238, 240 and 242, together with a film delivery conveyor 244 having rollers 246 on which developed film is delivered.

Carried by the frame portion 159, hereinbefore described, are thrust bearings 248 and 250, which rotatably retain the lead screws 228 and 230, respectively. These bearings hold the lead screws axially fixed but permit rotation thereof so that they may be rotated in internally screw threaded bearing blocks of bearing blocks 252 and 254, respectively, which are secured to the lower side of the film carriage frame whereby rotation of these lead screws may adjust the film carriage frame 226 in a manner to move the film 162 laterally of the axis of the lenses 158 and 160.

Figures 18, 19:
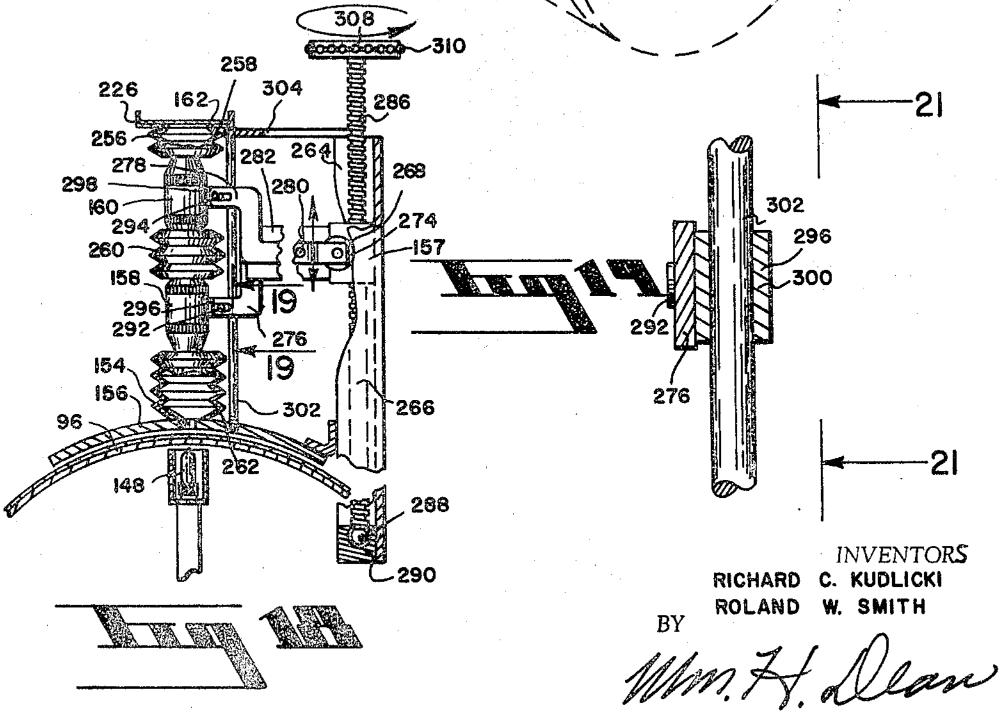
FIGURE 18 is an enlarged sectional view taken from the line 18—18 of FIGURE 17.
FIGURE 19 is an enlarged fragmentary sectional view taken from the line 19—19 of FIGURE 18.

As shown in FIGURE 18 of the drawings, the film carriage frame 226 is channel-shaped in cross-section and is provided with an open portion 256 below the film 162 to permit exposure of the film 162 to light from the lamp 148 which passes through one of the drum sections 96 and the opening 154 in the shield 156 and also through the lenses 158 and 160, as hereinbefore described.

In the space between the lens 160 and the bottom of the film carriage frame 226 is a bellows 258 disposed to provide a light shield or tunnel around the axis of the exposure field of the film 162.

Another similar accordian type light shield 260 forms a tunnel between the lenses 158 and 160, and a third accordian type shield 262 is disposed between the lens 158 and shield 156 and surrounding the opening 154 therein.

As hereinbefore described, the frame 157 is supported by the frame portion 159 of the frame 54 and this frame 157 supports the lenses 158 and 160, as will be hereinafter described. The lenses 158 and 160 are held in axially aligned relation with lamp 148, which is fixed on the shaft 74, as hereinbefore described. The frame 157 is held in stationary position in connection with the frame 54, which is the main frame of the machine.

The frame 157 is generally channel-shaped in cross-section and is provided with a pair of channel flanges 264 and 266. Edges of these flanges are contoured to provide cam surfaces 268 and 270, respectively. Engaging these cam surfaces are cam following rollers 272 and 274, respectively. These rollers are rotatably mounted on levers 276 and 278, respectively, which are mounted on a common pivot pin 280 carried by a bracket 282 having an internally screw threaded nut 284 screw threadably engaged with a lead screw 286. The nut 284 is vertically slidably movable in the channel-shaped frame 157 between the channel flanges 264 and 266 thereof. The lower end of the screw 286 is supported on ball bearing 288, stationarily mounted in a bearing block 290, carried by the lower end of the frame member 157.

The levers 276 and 278 are provided with pivot pins 292 and 294 which extend through slots in brackets 296 and 298 secured to the lenses 158 and 160, respectively.

The brackets 296 and 298 are similar and are shown generally in FIGURES 19 and 21, therefore the bracket 296 will be described in detail. The bracket 296 is provided with a bore 300 vertically slidably mounted on a guide rod 302 supported at its upper end by a bracket 304 extending from the frame 157. The lower end of the guide rod 302 is secured to the shield 156 which is supported in connection with the frame member 157.

The bracket 296 supporting the lens 158 is thus slidable vertically on a guide rod 302 and the lever 276 actuated by the cam following roller 272 is connected by the pin 292 which extends through a slot 306 in the bracket 296. The pin 292 is thus free to slide in the slot 306 of the bracket 296 when the lens 158 is moved upwardly and downwardly on the rod 302. The lever 276 at the pin 296 tending to move in an arc is thus free to carry the pin 292 in an arc to slide in the slot 306 accordingly. Thus, the slots 306 compensate for the arcuate travel pin 292 carried by the lever 276 about the pivotal axis 280 when the cam following roller 272 is actuated by the cam surface 264 as the lead screw 286 moves the nut 284 upwardly or downwardly with relation to the respective drum 96 and the film 162 in order to change the focal positions of the lenses 158 and 160 to provide for photographic enlargement of the exposure on the film 162 as regards the illumination of a character on the respective band 102.

It will be appreciated that since the film 162 operates in a plane at a fixed distance from the respective drum 96, the two lenses 158 and 160 are necessary to provide for enlargement and these lenses, while they may be moved toward the drum 96 or away therefrom in unison, they must also be varied in their spaced relation to each other accordingly, and, therefore, the cams and levers actuating them automatically coordinate the focus of these lenses to provide for the enlarging function, all of which is accomplished by rotation of a lead screw 286 by means of a ball chain sprocket 308 fixed to the lead screw 286 and engaged by a ball chain 310. This ball chain 310 passes over pulleys 312, 314, 316 and 318 at opposite ends of the ball chain 310 are connected to pulleys 320 and 322 on a common shaft 324 operable by a manual control knob 326. The opposite ends of the chain 310 are connected to operate in reverse directions on the pulleys 320 and 322 so that the knob 326 may be used to rotate the lead screw 286 and to provide for vertical adjustment and vertical focus spacing of the lenses 158 and 160.

The enlargement function occurs when the lenses are moved toward a drum section 96 and reduction occurs when the lenses are moved toward the film 162.

As shown in FIGURE 4 of the drawings, the frame member 220 is provided with an upstanding portion on which bearings 216 and 218 are mounted and which provide bearings for the rotary support of the shaft 196. This shaft 196 is provided with a key slot 197, providing a key way for a key carried by the sprocket 198 which drives the chain 200, herein before described.

The sprocket 198 is mounted between a bearing 216 and a bracket 217 so that axial movement of the shaft 196 through the sprocket 198 does not displace it relative to the sprocket 202 hereinbefore described.

The frame member 220 is provided with a slot 330 through which a bracket portion 332 of lead screw nut 334 projects. The bracket 332 is provided with an opening 336 through which the shaft 196 extends and fixed to the shaft 196 above and below the bracket 332 are collars 338 and 340 adapted to rotate adjacent to the bracket 332.

The nut 334 is provided with an internally screw threaded bore 342, screw threadably engaged with a lead screw 334 having a flanged thrust bearing 346 fixed to one end thereof, and held captive in thrust bearing brackets 348 and 350 fixed to the frame 220. The upper end of the lead screw 344 is rotatably mounted in a bearing bracket 352. Secured to the upper end of the lead screw 344 above the bracket 352 is a flexible shaft 354 which is adapted for use in manually rotating the lead screw 344 to cause the nut 334 to traverse the screw longitudinally and to carry the bracket portion 332 upwardly or downwardly against the collar 338 or 340. The shaft 196 is thus moved upwardly or downwardly in order to adjust the position of the periphery of the roller 194 fixed to the lower end of the shaft 196 so that it may engage the face 192 of the disc 188 and various radii so that the shaft 196 may be rotated a greater or lesser amount in accordance with rotation of the shaft 166 and the cam 142 fixed thereto. Thus, while the cam 142 is rotated by the motor 184, as hereinbefore described, the roller 194 may be rotated a greater or lesser distance in proportion to the operation of the cam and adjustment of the roller outwardly to a greater radius of the surface 192 may correspond with an adjustment of the lenses 158 and 160 to provide for enlargement of exposure of letter character images on the film 162. Thus, greater spacing drive of the film 162 may be accomplished by moving the shaft 196 upwardly to increase the distance of the roller 194 from the axis of the shaft 166. And, consequently, the film driven by the shaft 196, as hereinbefore described, may be driven a greater distance to correspond with the printing of larger characters on the film 162.

The flexible shaft 354 is connected to a rotatable wheel 356 on the console 51 of the machine, as shown in FIGURE 1 of the drawings, so that the spacing, as calibrated on the wheel 356, may be set to correspond with the enlargement adjustment provided by the hand wheel 326 shown in FIGURES 1 and 17. It will be appreciated, therefore, that the operator when choosing the degree of enlargement of the reproduction of characters on the film 162 rotates the wheel 326 to the desired calibration and then rotates the wheel 356 to the desired calibration for proper spacing of the enlarged photographic reproductions on the film 162.

As will be hereinafter disclosed, the means utilized for varying the spacing drive of the film 162 may be modified in several ways to coordinate between the cam 142 and its equivalent with the driving of the film and with respect to the relative enlargement provided by the optical system, including the lenses 158 and 160.

Referring now to the portion of the machine which accomplishes indexing and rotation of the drum assembly 82, attention is called to FIGURES 2, 9, 11, 12 and 13 of the drawings.

Carried by the bracket 72, shown in these figures, is an indexing pin 358 which is provided with a cylindrical portion 360 adapted to be engaged between the ribs 98 of the drum sections 96.

This pin 358 is provided with an external screw threaded portion 362, which is screw threaded in the bracket 72, hereinbefore described. The cylindrical portion 360 is of a diameter substantially equal to the spacing between the ribs 98 of the drum sections 96. Slots 364 are provided laterally through the ribs 98 to permit longitudinal movement of the drum assembly on the rods 58, as hereinbefore described, and to permit the drum assembly to pass the cylindrical portion 360 of the pin 358. This pin 360 is thus stationarily supported by the bracket 72 and this bracket 72 is fixed to lower end portion of the frame 157 so that the bracket 72 is a stationary portion of the frame 54. The bracket 72 thus remains stationary and the drum assembly 82 moves relative to the cylindrical portion of the pin 360 and the slots 364 permit the ribs 98 to pass the cylindrical section 360.

Figures 11, 12, 13:
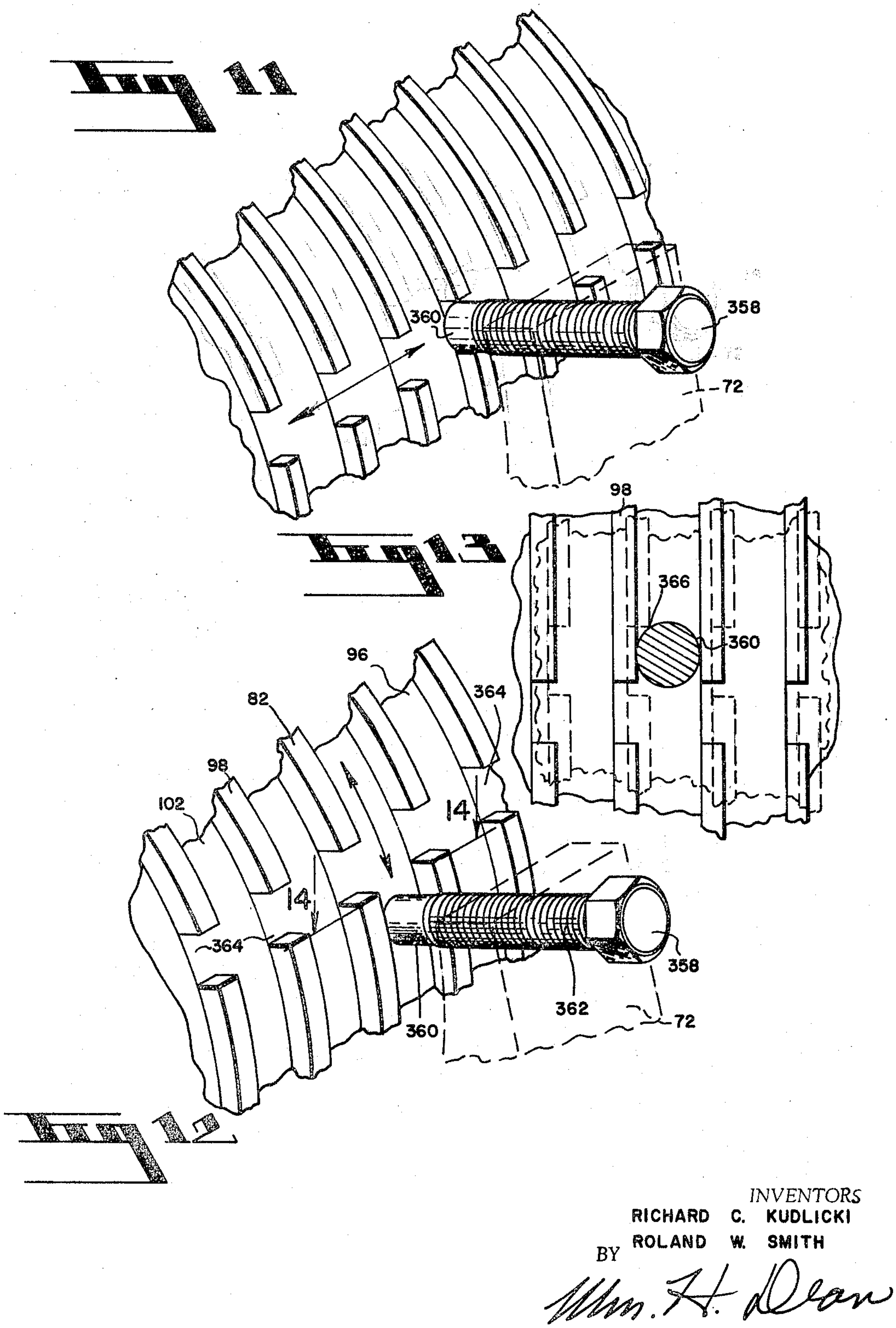
FIGURE 11 is an enlarged fragmentary perspective view of a portion of the drum assembly as shown in FIGURE 9 and showing further means for indexing an annular section of the drum assembly.
FIGURE 12 is another view similar to FIGURE 11 but showing indexing means in a varying engaged position with respect to that shown in FIGURE 11.
FIGURE 13 is a fragmentary side elevational view of the structures shown in FIGURES 11 and 12, showing by broken lines indexing action of the drum assembly of the invention.

As shown in FIGURE 13, it will be seen that when edge portions 366 of any of the ribs 98 at the slots 364 are not fully indexed the drum is cammed into a solid line position as shown in FIGURE 13 in order that the ribs 98 will be disposed on diametrically opposite portions of the cylindrical portion 360 of the pin 358 upon initiation of rotation of the drum assembly into a position wherein one of the characters 104 will be disposed in alignment with the opening 154 in the shield 156.

Figure 5:
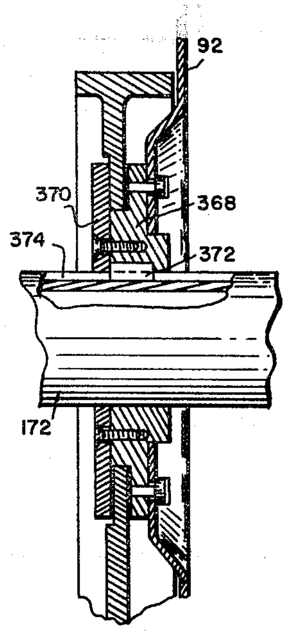
FIGURE 5 is an enlarged fragmentary sectional view taken from the line 5—5 of FIGURE 3.

As shown in FIGURE 5 of the drawings, the end plate 92 of the drum assembly 82 is secured to a hub 368 having a bore portion 370 slidably fitted over the periphery of the shaft 172 and projecting from the bore 370 is a key 372 which is engaged in a longitudinal slotted keyway 374 in the periphery of the shaft 172 so that the shaft 172 may drive the drum assembly 82 rotationally about the axis of the stationary shaft 74. The shaft 172, as hereinbefore described, is supported on a bearing 170 surrounding the shaft 172, which in turn is supported on bearing 168 surrounding the shaft 166 and carried by the hub 146, all as hereinbefore described.

The shaft 172 at its opposite end is supported by bearing 376 carried in the hub 190, hereinbefore described, which is fixed externally in the shaft 166 which is supported in the bearing 227 carried stationarily by the hub 222 mounted on the frame member 220.

Fixed to the shaft 172 is a gear 174 in mesh with a gear 378 forming one member of a gear train disposed to rotationally drive the drum assembly by means of shaft 172 keyway 374, therein, and the key 372 engaging the hub 368 secured to the end plate 92 of the drum assembly 82.

The brackets 60 and 62 which carry the drum assembly 82, as hereinbefore described, support a gear rack and detent member 380 which moves with the drum assembly 82. Rotatably mounted on the bracket 72 is a spur gear 382 disposed in mesh with a gear rack portion 384 of the member 380. Fixed to the gear 382 is a ball chain sprocket 386 engaged by a chain 388 passing over rollers 390 and 392 and also over rollers 394 and 396, rotatably mounted on a stationary shaft 398. The ball chain 388 at its intermediate portion 400 passes over another ball chain sprocket 402. This ball chain sprocket 402 is mounted on a shaft 404 to which a hand wheel 406 is fixed and this hand wheel 406 disposed on the panel of the machine, as shown in FIGURE 1 of the drawings, for manual operation.

It will be obvious to those skilled in the art, that rotation of the hand wheel 406 actuates the ball chain 338 to rotate the sprockets 386 and 402 and concurrently to rotate the sprocket 338 and gear 382 which actuates the rack 380 and the drum assembly 82 longitudinally of the bars 58, as hereinbefore described. Thus, individual drum sections 96 may be indexed in alignment with the pin 358 and the opening 154 and the shield 156.

Carried by the bracket 72, as shown in FIGURE 10 of the drawings, is a spring detent mechanism 408, which is engageable with notches 410 in the top of the gear rack and detent member 380. This ball detent 408 serves as a general indexing mechanism for stopping and holding the drum assembly 82 in such position so as to align individual drum section 96 with the opening 154 and the lenses 158 and 160. This ball detent 408 also provides for general alignment of the ribs 98 to straddle the cylindrical section 360 of the pin 358, as hereinbefore described. Thus, any one of the drum sections 96 may be selected manually by the rotation of the hand wheel 406 so that any style or font of type character 104 may be chosen by moving one of the bands 102 into index position and in alignment with the opening 154 and lenses 158 and 160.

When one of the bands 102 has thus been indexed, the drum assembly 82 may be rotated so that any one of the characters 104 may be indexed with the opening 154 and lenses 158 and 160 so that the lamp 248 when energized will cast a character image of the character 104 on the film 162.

The drum assembly 82 is rotated by means of shaft 172 and its key 372, as hereinbefore described, and the gear 174 in mesh with the gear 378 are driven as will be hereinafter described in detail.

The gear 378 is mounted on a shaft 412 carried by a frame member 414. A spur gear 416 is likewise mounted on a frame 414. This gear 416 meshes with gear 378 and also with another spur gear 418 carried on a shaft 420 controlled by a brake 422 coupled to a motor 424, which is disposed to drive the shaft 420 and the gear 418.

It will be seen that the gear 418 drives the gear 416 and the gear 378 and 174 in mesh therewith, to rotate shaft 172 and the drum assembly 82. The gear 418 also drives a spur gear 426 rotatably mounted on the frame 414. Driven on the shaft of the gear 426 is a potentiometer 428, the operation of which will be hereinafter described in detail.

The gear 426 also meshes with another gear 430 mounted on a shaft 432 having one end rotatably mounted on the frame member 414 and having its opposite end rotatably mounted in a frame bracket 434, all as shown best in FIGURE 2 of the drawings.

Mounted on the shaft 432 adjacent to the bracket 434 is a rotary coded switch 436, the operation of which will be hereinafter described.

Figure 22:
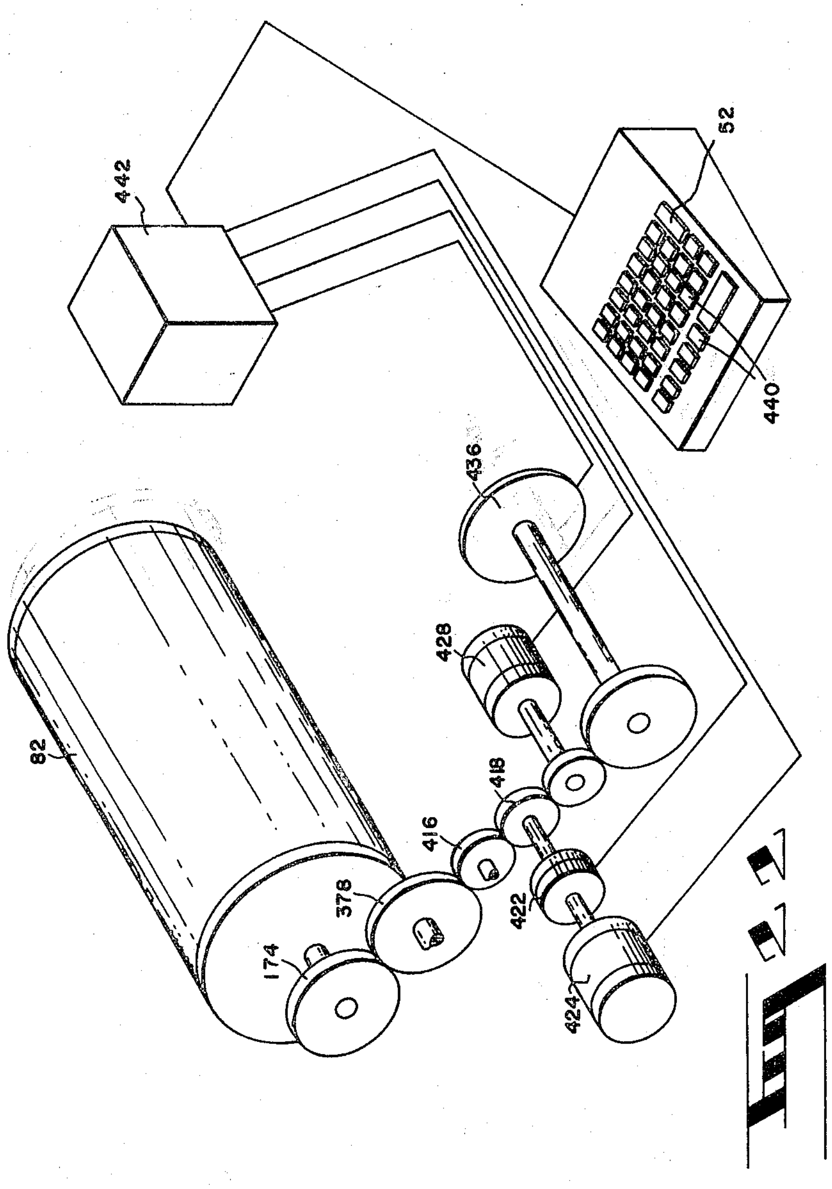
FIGURE 22 is a diagrammatic view of the rotatable drum assembly of the invention showing drum rotational gear train and drive mechanism together with a coded switch and control circuits in block diagram which are coupled to the keyboard of the machine for controlling rotation of the font carrying drum assembly by the direct current mode.
Figure 23:
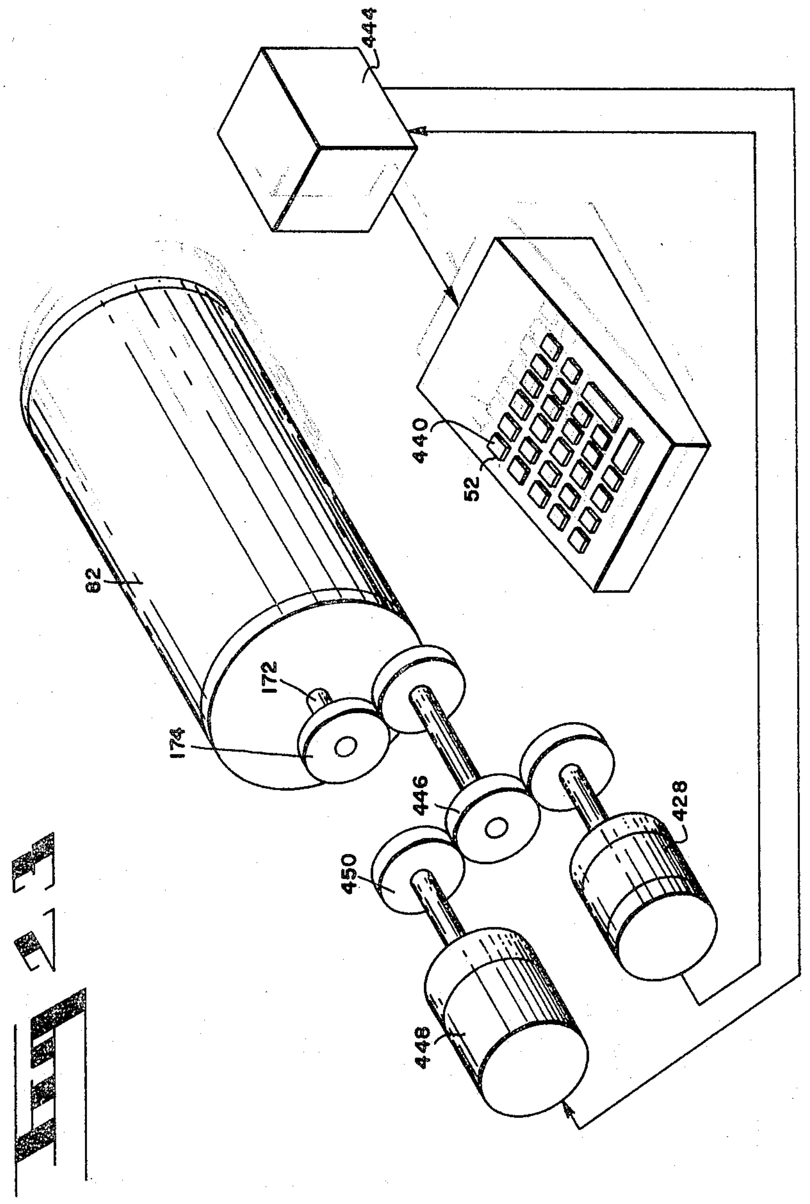
FIGURE 23 is a view similar to FIGURE 2, but showing a modification of the structure shown in FIGURE 2, namely, a servo-control system as distinguished from a direct current control system shown in FIGURE 22.

Rotation of the drum assembly 82 is controlled by means of the keyboard 52 shown in FIGURE 1 of the drawings. This keyboard 52 is also shown in FIGURES 22 and 23 of the drawings. The keyboard 52 is provided with keys 440 which correspond with characters 104 on the bands 102 hereinbefore described. Accordingly, each key 440 operates as an electrical switch control and is actuated, as for example, when the operator presses the key corresponding to letter A of the alphabet, a switch is closed which rotates the drum assembly into a position wherein one of the characters 104, namely the letter A, is aligned with the optical system and the lamp 148, hereinbefore described.

As shown in FIGURE 22 of the drawings, a direct current control system operates the drum rotational mechanisms disclosed in FIGURE 2 of the drawings, thereby controlling operation of the drive motor 424, brake 422, the potentiometer 428, and the coded switch 436 for the purposes which will be hereinfater described.

When one of the switches 440 is depressed an electrical signal is applied to three separated electrical devices simultaneously. Thus, energy is applied to the coded switch 436 and motor start relay in enclosed circuitry 442 shown in FIGURE 22 of the drawings. The details of this circuitry are not disclosed herein. Further, motor speed circuitry in the enclosure 442 is energized to control operational speed of the motor 424.

Motor direction contacts of the coded switch 436 are arranged in such a manner that they correspond with various rotary angular positions of the drum assembly 82 and are disposed to energize a motor reversing relay for reversing the motor 424 if the position of the character 104, immediately chosen, is of a smaller angular value from a predetermined reference point than the position of the drum at the time of the character selection. This mechanism, thus, establishes the direction the motor 424 will rotate to drive the drum assembly 82 in a proper direction in order to place the respective character 104 in exposure position below the lens system with the least amount of rotational movement of the drum 82.

The motor start relay in the enclosure 442 applies an electrical impulse to rotate the motor; the motor speed control circuit in the enclosure 442 is equipped to compare a fixed voltage selected in accordance with the respective key 440 which operates a switch, hereinbefore described. This fixed voltage is, thus, compared with a variable voltage which varies as the rotational position of the drum varies, all in accordance with the disposition of the potentiometer 428 which is driven in unison with the drum assembly 82.

As the variable voltage of the potentiometer becomes more nearly equal to the fixed voltage preselected and at a predetermined difference of the two voltages, a relay is actuated to reduce the speed of the motor 424. Although the motor speed is reduced as the drum is rotated toward the desired position of the selected character to place it in alignment with the optical system, the rotational motion continues until the selected character position is reached at which time the coded switch 436 rotates to a position at which is disconnects an electrical signal from the motor start relay causing power to be disconnected from the motor 424, and also energizing an electromechanical brake 422 which firmly stops the drum rotation.

At this time the cam follower 122 is actuated into one of the notches 120 which further positions the drum to a precise location for alignment of the respective character 104 with the lenses 158 and 160, thus, operation of the drum assembly rotational mechanism is completed until the next key 440 is depressed which again activates all of the foregoing equipment to rotate the drum assembly 82 into another position corresponding with the key 440 which is depressed.

In accordance with a modification of the drum rotational system, as shown in FIGURE 23, keys 440 of the keyboard 52 may be depressed to activate an alternating current servo system.

This system employs a servomotor and servoamplifier for the rotational positioning of the drum assembly 82.

Manual depression of a key 440 on the keyboard, as shown in FIGURE 23, causes an electrical impulse to activate the circuitry 444 disposed to make a comparison of a voltage determined by the respective switch 440 with the position of the drum assembly 82. The potentiometer 428 being utilized to conduct a voltage or signal related to the angular position of the drum 82 as it rotates, the difference between the voltage applied by operation of the key 440 and the potentiometer 428 are compared by the circuitry 444 until this difference reaches zero, all of which causes the servomotor 448 to stop the drum assembly 82 in the desired position. It will be seen that the servomotor 448 is provided with a gear 450 which is meshed with a gear 446 similar to that hereinbefore described, and that the potentiometer 428 is operated in a similar manner to that hereinbefore described.

It will be appreciated that rotational operation of the drum assembly 82 is functionally related to intermittent movement of the film 162 and that the means hereinbefore described for moving the film may be considered as an example only in the general functional equipment, however, means which will be hereinafter described and operated in connection with the drum rotational equipment provides for automatic film spacing to include compensation for the magnification ratio or the optical system, also justification spacing and compensation for sequential spacing of the film to accommodate adjacent characters commonly known as bad character combinations.

Figure 25:
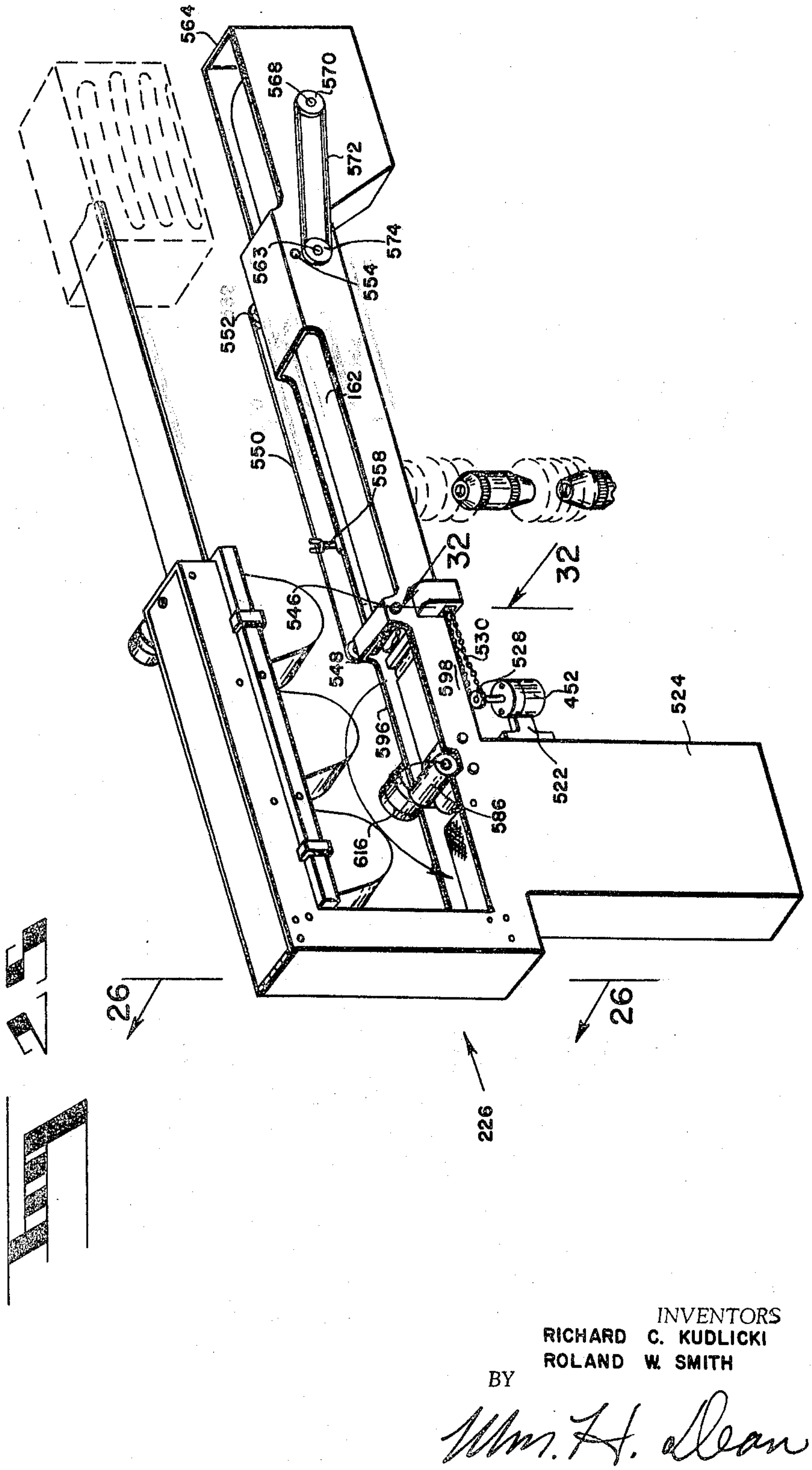
FIGURE 25 is a perspective view showing film handling and processing mechanism of the invention.

Accordingly, attention is called to FIGURE 33 of the drawings illustrating a digital film positioning system wherein the keyboard 52, coded switch 436, cam 142, shaft 166 and lenses 158 and 160 are disclosed. Further, with reference to FIGURE 25 showing a modification mechanical version of the film drive, a film drive motor 452 is disposed to drive the film 162, all as will be hereinafter described in detail. The general movement of the film 162 is similar to that hereinbefore described and with reference to FIGURE 33 the digital film positioning system utilizes the motor 452 independently of the motor 184, hereinbefore described, for driving the film 162. Thus, according to the digital system shown in FIGURE 33, the motor 184 by means of the gear drive and shaft 166 drives the cam 142 to which is connected a variable resistance device 454 which varies an electrical signal in proportion to the rotation of the shaft 166 and directly controls an electrical signal in proportion to the depth of the notches 120, as hereinbefore described. Accordingly, when the motor 184 is energized to drive the cam 142, the shaft 166 rotates a distance as limited by the cam 142 and follower 122 which, in turn, is limited by the depth of a respective notch 120. Thus, the variable resistance device 454 coupled to a conductor 456 applies a voltage to a mixer 458. Additionally, the optical system, including the lenses 158 and 160, is provided with an arm 460 carrying an element of a variable resistor device 462 which controls an electrical input to the mixer 458 through a conductor 464 and in series with this variable resistance 462 is another variable resistance 466 operable by a manual justification control to be manually operated at the console 51, as will be hereinafter described. Connected to the variable resistance 466 is a conductor 468 coupled to the mixer 458.

The coded switch 436 contains variable resistance means which corresponds with the various characters 104 and their respective spacing requirements, as for example, this coded switch coupled to the drum assembly 82 corresponds in signal input to the system with relation to the various characters 104. As for example, there is a difference in space requirements for the letter M and the letter I for the letter A. Thus, the coded switch 436 in the digital system shown in FIGURE 33 accounts for compensation relative to bad character combinations when images of two characters are successively photographically reproduced adjacent each other and require reduced spacing or film drive. As for example, when an A and a T are disposed adjacent to each other, the film drive must be reduced so as to compensate for such a bad character combination. The coded switch 436, thus, provides for this compensation through a conductor 470 coupled to a selection logic circuitry 472 which is also coupled by a conductor 474 with a K on the keyboard 52. Accordingly, the operation of the keyboard 52 and the coded switch 436 in combination with the selection logic circuitry 472 tends to compensate for bad character combinations in which certain narrow letters are successively exposed on the film 162 in such a manner as to require reduced film drive spacing, all as will be hereinafter described in detail.

When a character is selected on the keyboard 52 and a respective key is depressed, its switch conducts an impulse to the selection logic circuitry 472 simultaneously with a signal from the coded switch 436, both signals being combined logically to determine character combinations spacing requirements, as hereinbefore pointed out. A conductor 476 conducts the output from the selection logic circuitry to the mixer 458. In the mixer circuitry 458 several different signals are combined to cause an output from the mixer in the form of a pulse, the duration of which is proportional to the fully compensated character spacing which involves not only the bad character combination spacing, but the type style compensation controlled by the variable resistance 454 and, also, the magnification compensation controlled by the variable resistance 462 and, also, the justification compensation controlled by the manual variable resistance control 466. The compensated character spacing from the mixer is carried by a conductor 478 to a pulse gate circuit 480. The pulse gating circuit allows pulses from a pulse generator 482 to pass via a conductor 484 through the pulse gate 480 to an accumulator and a substracter circuitry 486. The pulse from the pulse generator is allowed to pass through the pulse gate 480 for the duration of the pulse output of the mixer 458.

The total number of pulses that pass through the gate circuit will be proportional to the distance that the film 162 must move. It will be understood that the pulse generator may produce a very large member of pulses in proportion to the duration of the pulse from the mixer. Thus, the pulse gate controls the number of pulses from the pulse generator which may pass via a conductor 488 to the accumulator and substractor circuitry. In effect, the accumulator substractor circuitry is a memory circuitry wherein the number of pulses from the pulse generator are stored, said number being proportional to the duration of the pulse from the mixer 458.

When the character is selected by depression of a key on the keyboard 52, a motor start relay 491 is energized and the film drive motor 452 is started which begins advancing the film and concurrently operating a gear train 490 which which drives a digital pickoff device 492. The digital pickoff device 492, as it is rotated, generates or conducts a plurality of successive pulses related to the motion of the film so that a large number of the pulses are generated for each unit of travel of the film. For example, the relationship could be such that for each inch the film moves, the digital pickoff device would generate 1000 pulses. In this manner, the resolution of the system might be in the order of .001 inch to .002 inch.

These output pulses of the digital pickoff device 492 are fed via a conductor 494 to the accumulator substractor circuitry 486 where the pulses from the digital pickoff device 492 are substracted from the pulses allowed to pass into the accumulator substractor circuitry from the pulse generator 482. As the substraction of pulses occurs and when the remainder of pulses reaches zero a motor stopping relay 495 is energized which stops the motor 452 and consequently the film drive. Accordingly, it will be appreciated that the digital system disclosed in FIGURE 33 combines all of the compensating influences relating to the particular bad character sequential letter combinations, the type style, the magnification, and the spacing justification, as hereinbefore described.

A modification of the film drive circuitry is shown in FIGURE 34 of the drawings and this modification relates to an analog film positioning system.

This system includes the cam 142, the shaft 166, and the variable resistance device 454 having an output conductor 496 coupled to a resistance 498 to which a plurality of conductors 500 are coupled as outputs from the selection logic circuitry 472 which is coupled by a conductor 474 to the keyboard 52. Additionally, it will be seen that the coded switch 436 is coupled by means of the conductor 470 to the selection logic circuitry 472. An output from this circuitry 472 is provided by a conductor 502 which is coupled to the variable resistance 466 to compensate for manual justification. The output from this resistance 466 is conducted by a conductor 504 to an operational amplifier 506. Also, coupled to the amplifier 506 is a conductor 464 receiving an output from the magnification variable resistance compensator 462 coupled to the lenses 158 and 160 and variably operated in connection with the arm 460 connected therewith.

An output from the amplifier 506 is carried by a conductor 508 to a comparator 510 having a conductor 512 coupled to a variable resistance feedback 514 operable in connection with the film drive motor 452. Coupled to the motor 452 is a conductor 516 which receives an output from a motor stop relay 518 which is controlled through a conductor 520 coupled to the comparator 510.

From the foregoing it will be seen that the present analog film positioning system is one in which two voltages are compared and when the two voltages are equal, the relay 518 is energized to stop operation of the film drive motor 452. One of the voltages is developed by positioning of the feedback potentiometer 514 which is mechanically coupled to the film drive motor 452 or its related system. The voltage at the output of this potentiometer is conducted to the comparator 510 where it is compared to another voltage which is the output of the operational amplifier 506. The operational amplifier operates upon the input thereto to produce an output voltage proportional to the desired distance the film must move. The inputs to the operational amplifier 506 are in turn modified by the potentiometer 454 driven by the motor 184 in connection with the shaft 166 and cam 142. Thus, compensation is made for the type style of the characters 104 on the drum assembly 82. The character combination spacing is controlled by the keyboard in combination with the coded switch, as hereinbefore described, and utilizing the selection logic circuitry 472 together with the justification resistance 466, and, also, the magnification compensation provided by the variable resistor 462.

When a character is selected on the keyboard, the operational amplifier 506 senses the voltages developed at the input thereto and sends them to the comparator while simultaneously the film drive motor is energized in a similar manner, as hereinbefore described which moves the film and the feedback potentiometer simultaneously until the voltage output of the feedback potentiometer equals that of the operational amplifier output and the motor stop relay 518 is energized when the comparator senses the predetermined comparison of the voltages moving through the conductors 508 and 512. Thus, the motor stop relay is energized for stopping the motor 452 precisely to limit movement of the film 162 in accordance with the various compensating factors hereinbefore described.

With reference to FIGURE 25 of the drawings, it will be seen that the film drive motor 452 is mounted by means of a bracket 522 to a side wall of a film storage tank 524 forming a part of the film drive frame structure generally designated 526 in FIGURE 25 of the drawings.

Figure 32:
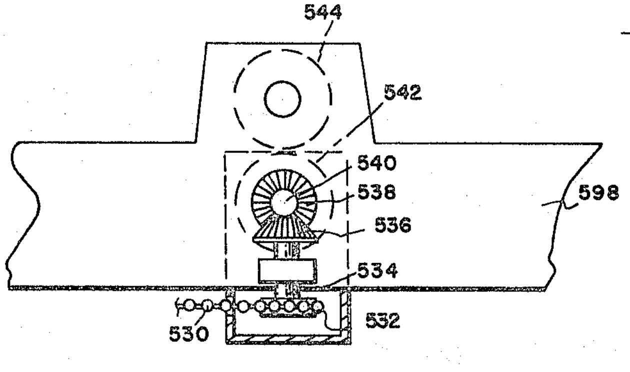
FIGURE 32 is an enlarged fragmentary sectional view taken from the line 32—32 of FIGURE 25.
Figure 17:
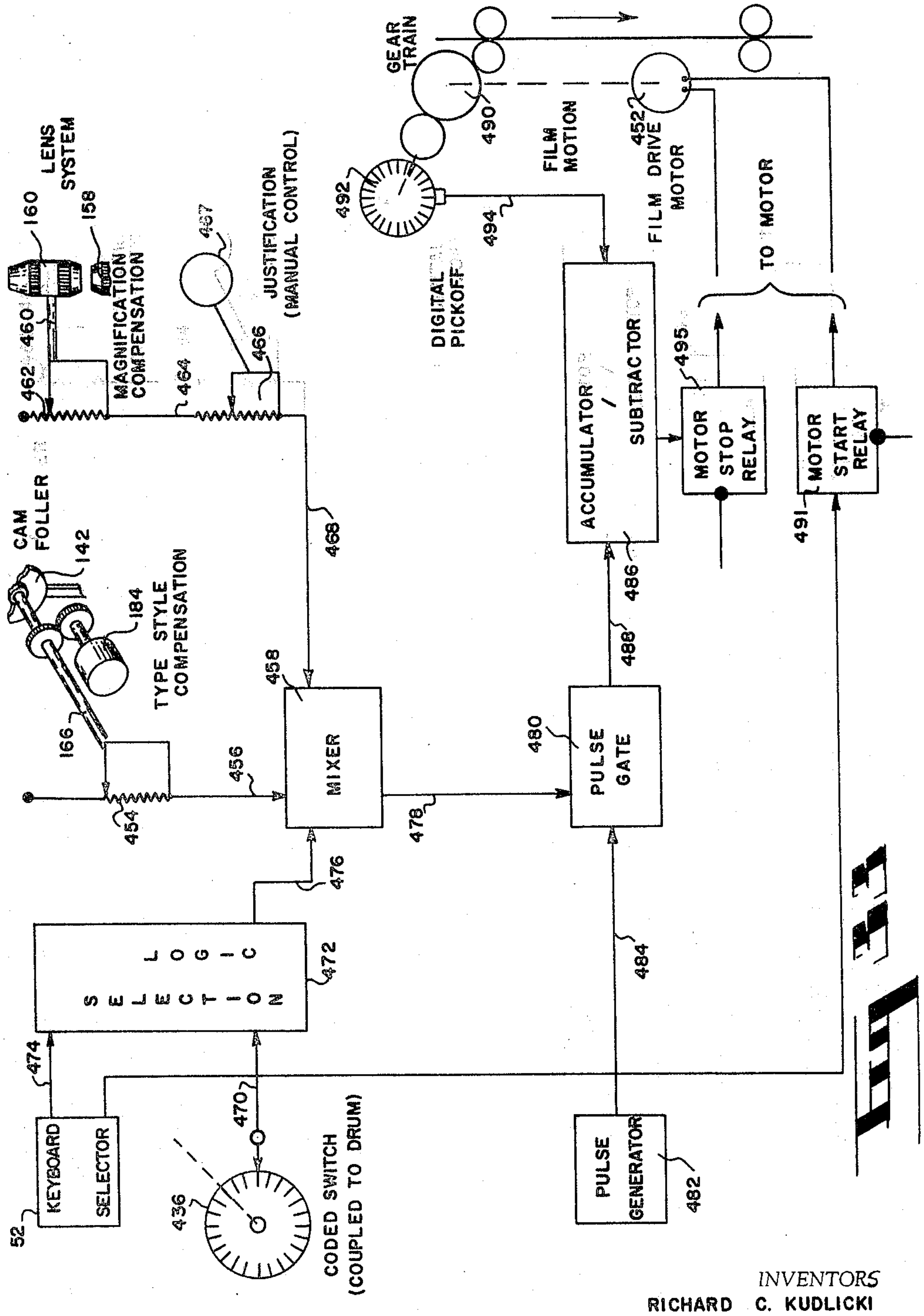
Figure 24:
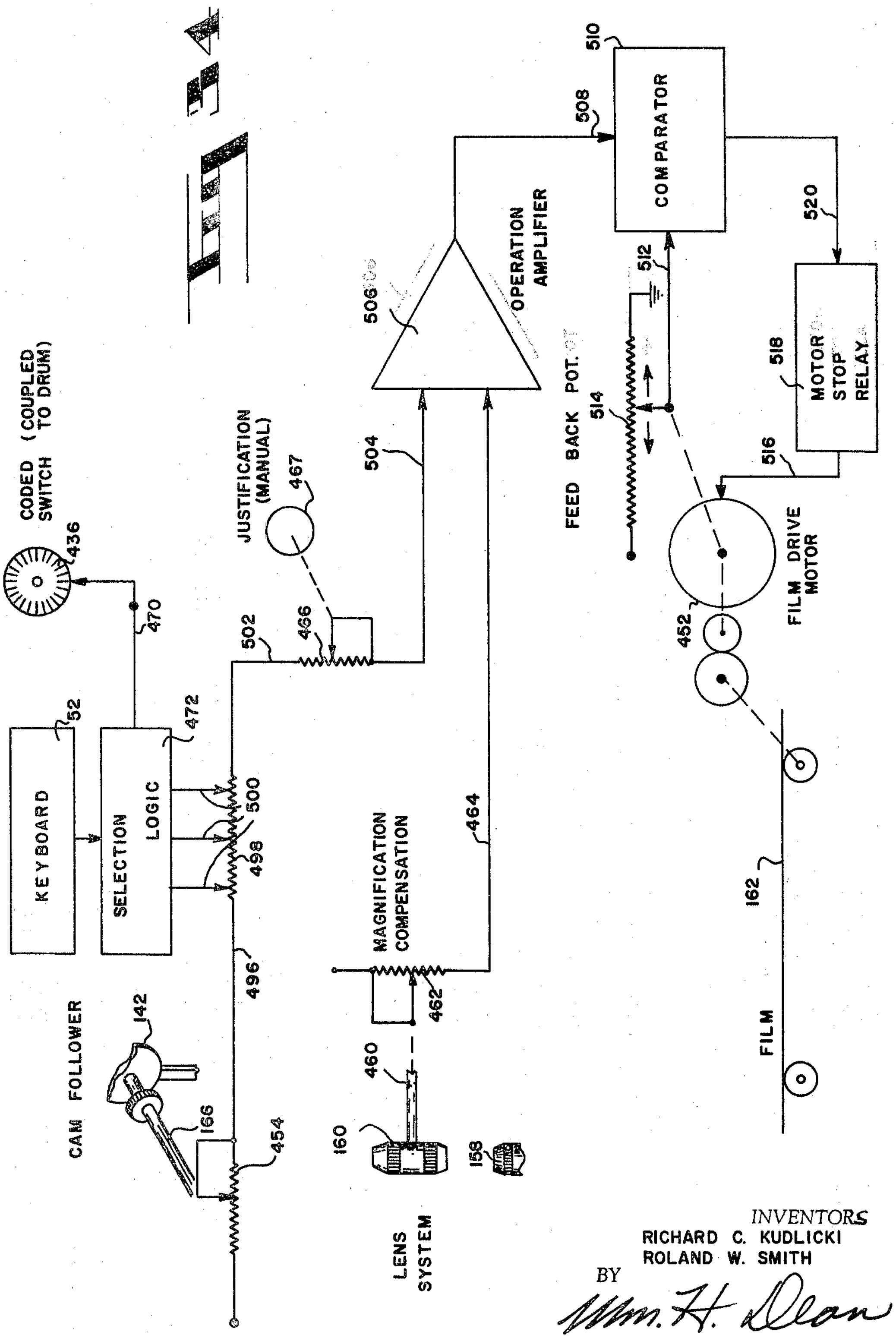

The motor 452 is disposed to drive a ball chain sprocket 528 engaged by a chain 530, also shown in FIGURE 32. This chain 530 engages a second ball chain sprocket 532 carried by a shaft 534 on which a mitre gear 536 is disposed in meshed relation with another mitre gear 538 on a film drive roller shaft 540 rotatably mounted on the frame 226. On the shaft 540 is a film engaging roller 542 which is frictionally engaged with an opposed roller 544 so that film may be driven between the peripheries of the rollers 542 and 544. The roller 544 is mounted on an axle 546, as shown in FIGURE 25, carrying a pulley 548 having a justification pointer belt 550 engaged therewith and also engaged over another pulley 552 on an axle 554 of another film drive roller 556. The belt 550 carries a pointer 558 which is disposed to be viewed through a window 560 on the machine console 51, this window having calibrations 562 disposed to provide dimensional justification operation with respect to the pointer 558, as viewed by the operator of the machine.

It will be seen that the pointer 558 is fixed to the lower run of the belt 550, which is an endless belt passing over the pulleys 548 and 552, and that the upper end of the pointer 558 is forked so that it slides relative to the upper rim of the belt 550 merely to hold the pointer 558 upright so that it may readily be viewed through the calibrated window 560 of the console.

Figure 26:
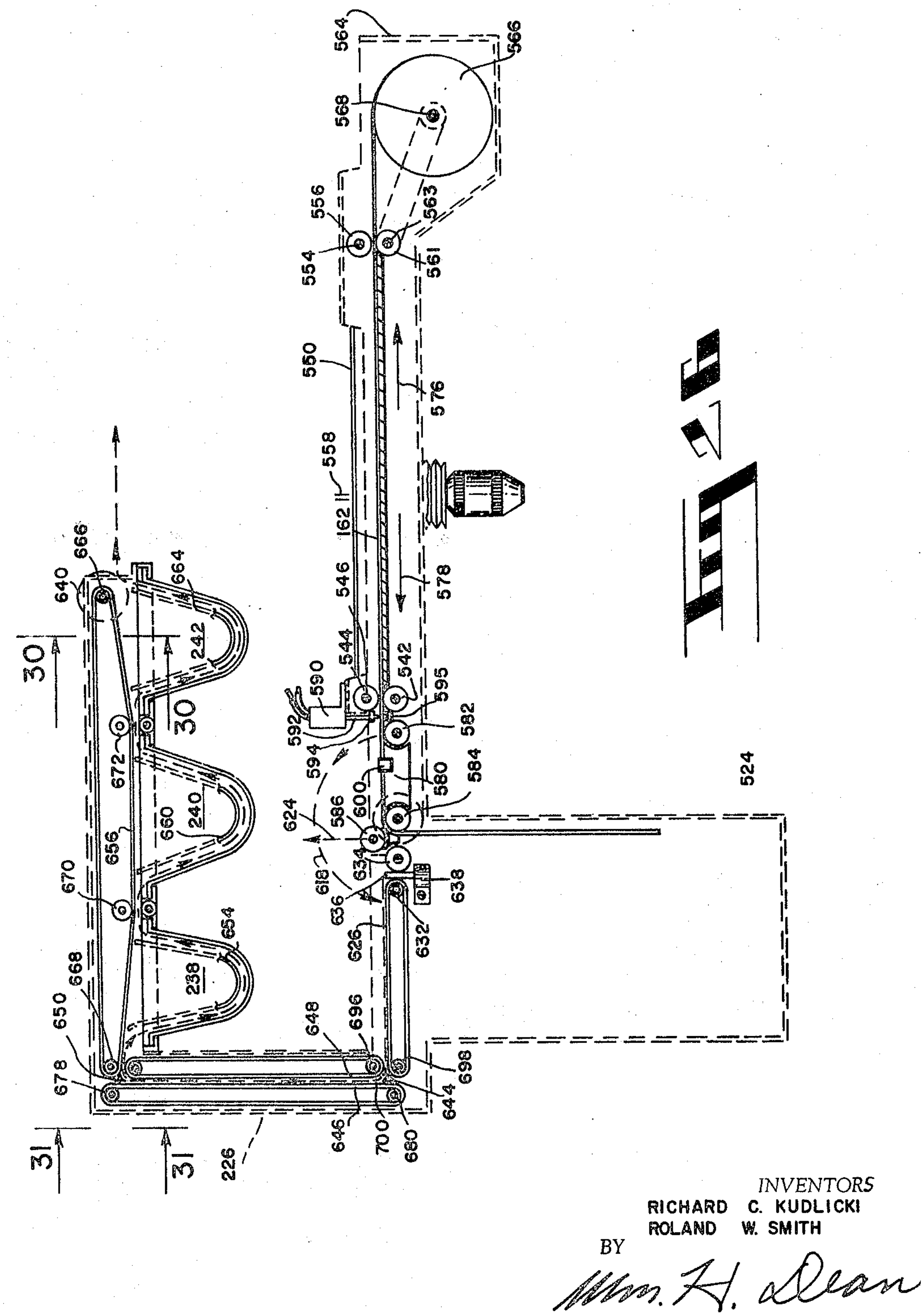
FIGURE 26 is a longitudinal sectional view of the film handling and processing mechanism taken from the line 26—26 of FIGURE 25.

Operably disposed directly below the roller 556 is another film drive roller 561 mounted on an axle 563, as shown in FIGURE 26 of the drawings.

A film magazine 564 is disposed to contain a reel of unexposed film 566 from which the film 162 is drawn by operation of the motor 452.

The reel 566 is mounted to rotate on an axle 568 projecting through opposite sides of the magazine 564 and mounted on one end of the axle 568 is a slip pulley 570 engaged by a slip belt 572 passing over another slip pulley 574 mounted on the roller axle 563, hereinbefore described. The belt 572 serves to rewind the reel 566 in the reverse direction when the film 162 is moved in a direction as indicated by the arrow 576 in FIGURE 26 of the drawings, and inasmuch as the reel 566 is always larger in diameter than the drive roller 542, the slip belt 572 will always rewind the film onto the reel 566 when the motor drives the film in the reverse direction, as indicated by the arrow 576. This drive is accomplished through the roller 542, the belt 550, the roller 554, and the roller 561. The slip belt 572 thus merely taking up slack of the film 162 as it moves in reverse direction toward and onto the reel 566. Accordingly, when the film is advanced in the direction as indicated by an arrow 578 in FIGURE 26 of the drawings, the belt 572 merely slips with a very slight load thereon.

It will be appreciated that the film 162 may, thus, be reversed within the limits of travel of the pointer 558, as viewed through the calibrated window 560 on the console so that several superimposed lines of type may be exposed on the film laterally thereof, as desired, and in accordance with the foregoing description relating to the operational adjustment provided by the screws 228 and 230 for moving the frame 226 laterally, as shown in FIGURE 2 of the drawings; said frame 226 corresponding with the frame 526 shown in the modified structure illustrated in FIGURE 25 of the drawings, as hereinbefore described. Thus, the entire frame 526 may be moved laterally and axially with relationship to the adjustment screws 228 and 230.

It will be appreciated that with the lateral adjustment of the frame 526 by means of the screws 228 and 230, shown in FIGURE 2 of the drawings, that the pointer 558 may move toward and away from the window 560 only a distance substantially equal to a partial width of the film 162.

The film drive rollers 542 and 544 drive the film 162 in the direction of the arrow 578 as shown in FIGURE 26 of the drawings, and the film proceeds over a pivoted film carriage 580 which carries rotatable rollers 582 and 584. The film 162 passes over the roller 584 and beneath a movable roller 586, as will be hereinafter described. The film passes between the rollers 584 and 586 and downwardly into a storage tank 524 disclosed in FIGURE 25 of the drawings.

When a section of the film has been completely exposed and passes beyond the rollers 542 and 544 and is projected downwardly into the tank 524, the operator at the console of the machine may actuate a film cutoff button 588, as shown in FIGURE 1 of the drawings. This button operates a switch, not shown, but which energizes a solenoid 590 having an armature 592 carrying a cutoff blade 594 to project this blade 594 downwardly against the top of the film 162 and to cut the film off against a blade 595 disposed below the film and supported by the frame 526 between opposite side bars 596 and 598 thereof.

Figures 27, 28:
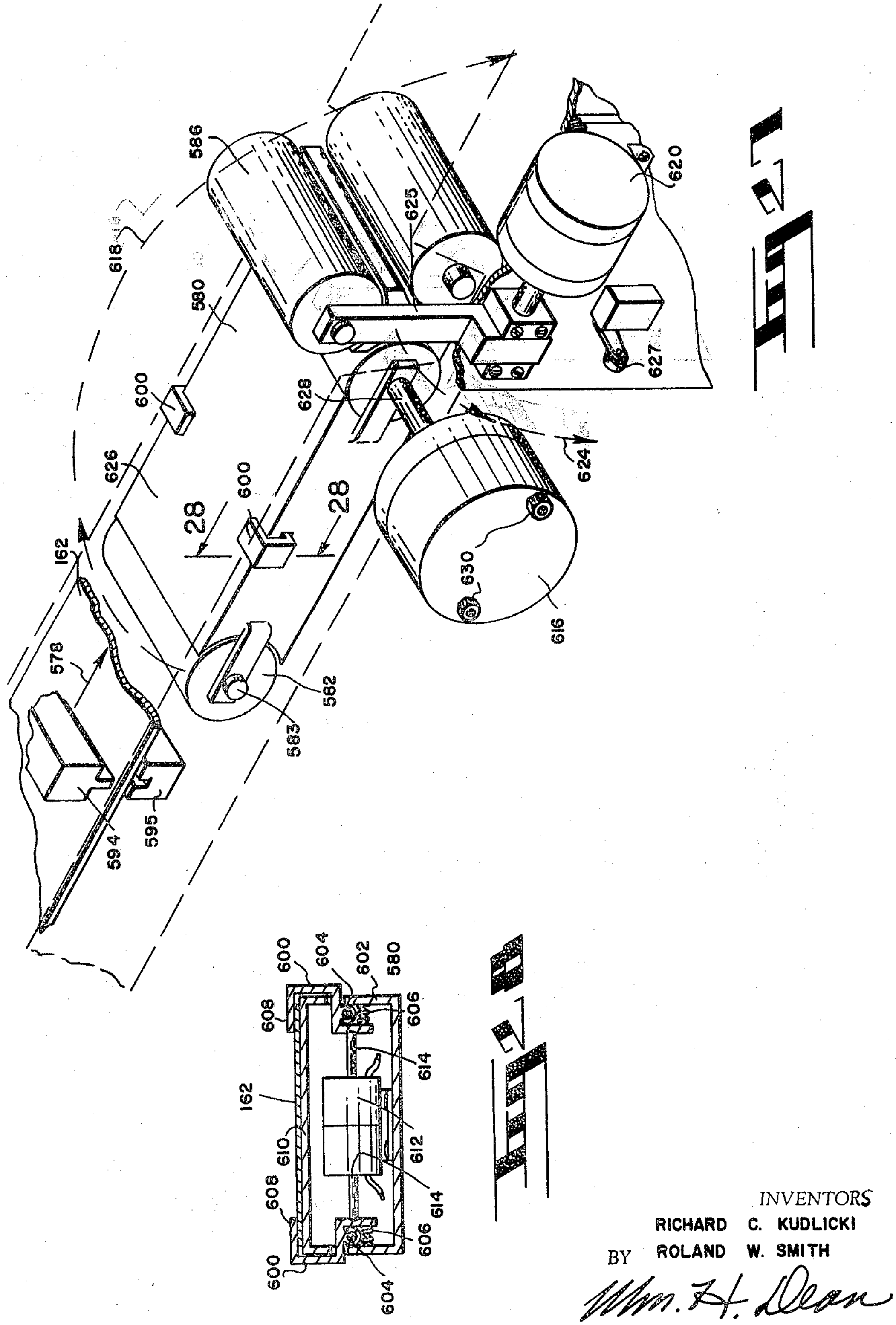
FIGURE 27 is an enlarged fragmentary perspective view of a portion of the film advancing mechanism of the invention taken from substantially the opposite side thereof from that as shown in FIGURE 25.
FIGURE 28 is a transverse sectional view taken from the line 28—28 of FIGURE 27.

When the button 588 is depressed and the solenoid 590 is energized to cut off the film a pair of film clamps 600 carried by the pivoted roller assembly 580 are actuated by solenoids to be hereinafter described. These film clamps are shown in detail in FIGURE 28. The roller assembly 580 is provided with a frame 602 on which the clamps 600 are pivoted by means of pins 604, while springs 606 tend to pivot the clamps 600 about the pins 604 and to force ends 608 of the clamps 600 away from the film 162 on a plate structure 610 of the pivoted roller assembly 580.

Spring loaded solenoids 612 are provided with plungers 614 which are normally spring loaded in a slightly retracted position, permitting the springs 606 to hold the lever ends 608 disengaged from the film 162.

When the solenoids 612 are energized the plungers 614 thereof force the levers 600 at their end portions 608 into firm clamping engagement with the film 162 for holding it against the plate 610 of the roller assembly 580.

The solenoids 612 are energized concurrently with the solenoid 590 so that when the film is cut off by the blades 594 and 595 the film 162 will be clamped to the frame of the roller assembly 580. Additionally, with the energization of the solenoids 590 and 612, an actuator motor 620 is energized to pivot the roller 586 in a direction as indicated by arrows 624 in FIGURE 26 of the drawings.

It will be appericated that the action of the solenoids 590 and 612 may be substantially instantaneous so that the motor 620 may be concurrently energized which causes pivotal action of the roller assembly bracket 625 in a direction of the arrows 624, while the clamps 600 hold the film securely in connection with the pivoted roller assembly 580.

As the motor 620 moves the roller 586 in a direction as indicated by the arrows 624, a supporting bracket of the assembly designated 625 contacts a limit switch 627, thereby energizing the motor 616.

Upon energization of the motor 616, roller assembly 580 is pivoted to engage an upper surface 626 of a belt film conveyor and to cause engagement of the cut off film 162 with this conveyor 626 subsequently to be moved into the film developing tanks, as will be hereinafter described.

It will be seen that the pivoted roller assembly frame 626 carries the film clamps 600, and also carries the roller 582 and a respective axle 583 therefor. The axle 583 is pivotally movable about an axis 628 of the motor 616 which is secured to the frame 626. The motor 616 is restrained against troque reaction by bolts 630 which are connected to the side member 596 of the frame 526, shown in FIGURE 25 of the drawings. Thus, the motor 626 pivots the roller assembly 580 into position over the conveyor 626 during movement of the roller 586 upwardly and out of the way, as indicated by the arrows 624, all as shown best in FIGURES 26 and 27 of the drawings.

Disposed between the roller 584 and a supporting roller 632 of the belt conveyor 626 is an idler roller 634 which is engaged by the film 162 when the pivoted roller assembly 580 is moved over the belt conveyor 626 in a direction as indicated by arrows 618.

When the pivoted roller assembly 580 moves to a position over the belt conveyor 626, one of the film clamps 600 engages a plunger 632 of a microswitch 638 which operates two time delay switches, not shown. One of the switches starts operation of a film drive developer motor 640, and the other time delay actuates the motor 616 in reverse after the film 162 has been moved from the tank 524 so that the roller assembly 580 may be again placed in the position shown in FIGURE 26 to receive film 162 from the rollers 542 and 544, as hereinbefore described.

After the conveyor 626 has been energized through the motor 640, as will be hereinafter described, the film moves to a guide 644 which directs the film upwardly between two belt conveyors 646 and 648. This occurs before the time delay controlling the motor 616 is activated to move the pivoted roller assembly 580 backward into the position as shown in FIGURE 26, and as illustrated by solid lines therein.

As the film 162 is moved upwardly out of the tank 524, it is held engaged with the belt conveyor 626 by the roller 586 until the film is engaged between the belt conveyors 646 and 648. These conveyors then transfer the film upwardly to a guide 650 which directs the film downwardly into a first processing tank 238 below a guide 654 stationarily carried by the frame 526. The film passes upwardly into engagement with a belt conveyor 656 and then downwardly into another processing tank 240 wherein another baffle 660 directs the film towards the bottom of the tank. As the film continues to move, it passes upwardly again into proximity of the conveyor 656 and downwardly into a third processing tank 242 below a stationary baffle 664 supported by the frame 526.

The processing tanks 238, 240 and 242 are readily removable from the frame 526 for the purpose of cleaning and recharging with chemicals.

As shown in FIGURE 26, the motor 640, by means of a roller 666, operates the endless belt conveyor 656 which also passes over rollers 668, 670 and 672 above the plane of the film moving through the processing tanks hereinbefore described.

Figure 29:
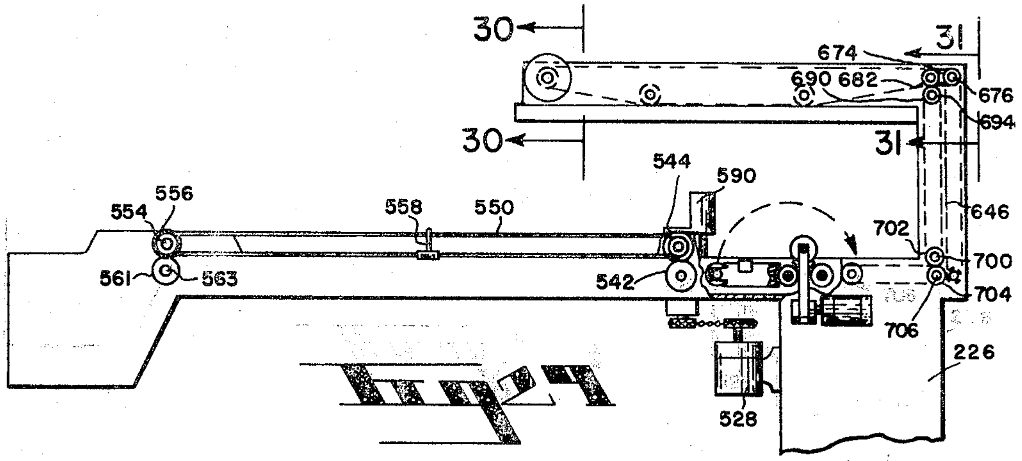
FIGURE 29 is another view of the film handling and conveyor mechanism taken from the opposite side thereof from that as shown in FIGURE 26, and illustrating the film conveyor drive mechanism of the invention.
Figure 30:
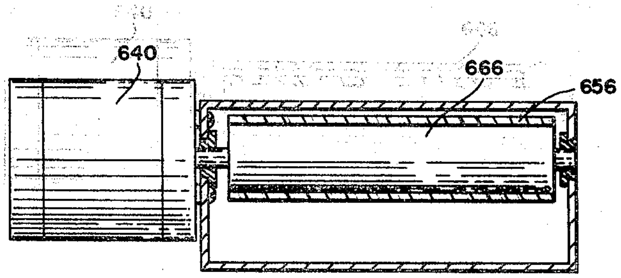
FIGURE 30 is an enlarged sectional view taken from the line 30—30 of FIGURE 29.

As shown in FIGURE 29 of the drawings, the roller 668 is provided with a pulley portion engaged by a belt 674 which also engages an upper roller 676 of the belt conveyor 656, hereinbefore described. This endless belt conveyor is provided with an upper roller 678 secured to the pulley 676, and is provided with a lower roller 680 adjacent the film guide 644, as hereinbefore described.

Figure 31:
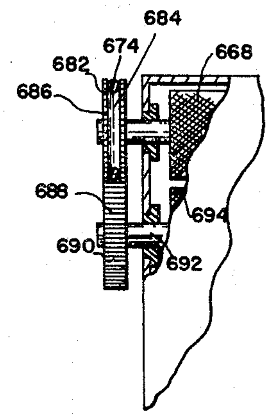
FIGURE 31 is an enlarged fragmentary view taken from the line 31—31 of FIGURE 29 showing portions further broken away and in section to amplify the illustration.

It will be seen that the roller 668 drives the pulley 682, shown in FIGURE 31 of the drawings, which drives the belt 674 hereinbefore described.

Reference is made to FIGURE 31 showing the pulley 682 coupled to the roller 668. This pulley 682 is provided with a belt receiving groove 684 which drives the belt 674. Additionally, external gear teeth on the rim of the pulley 682 are designated 686. These gear teeth 686 mesh with gear teeth 688 on the periphery of a gear 690 secured to a shaft 692 carrying a roller 694 with which the endless belt conveyor 648 is engaged. Another roller 696 supports the endless conveyor 648 adjacent to the conveyor belt 646 and its respective supporting roller 698, which is disposed adjacent the film guide 644, hereinbefore described.

The roller 696 is provided with a shaft 700 carrying a spur gear 702, as shown in FIGURE 29 of the drawings. This spur gear 702 meshes with another spur gear 704 carried on a shaft 706 of the roller 698 whereby the endless conveyor 626 is driven. Thus, all of the conveyors 626, 646, 648 and 656 are driven by the motor 640, as hereinbefore described, and this motor 640 is coupled to a time delay relay system timed out following actuation of the limit switch 638, as hereinbefore described.

The motor 640 thus operates a sufficient length of time to run the film through the tanks 238, 240 and 242, and then the motor is de-energized by the time delay opening a relay to the motor 640.

Figure 24:
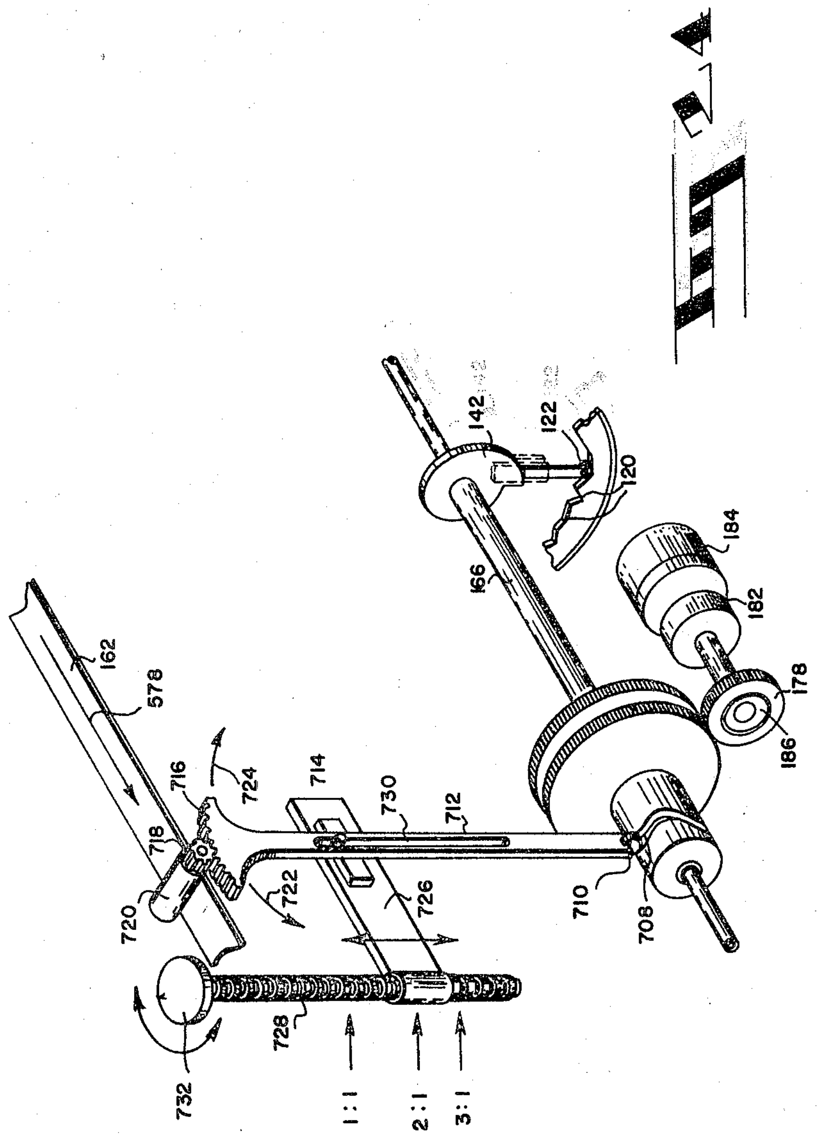
FIGURE 24 is a fragmentary perspective view of a modified manually adjustable film advancing mechanism shown operable in connection with a cam and cam follower of the invention associated with a font carrying drum and a notched flange thereof.

In accordance with a modification of the film drive mechanism, shown in FIGURE 24 of the drawings, it will be seen that the cam 142 operating the follower 122 in accordance with the notches 120 limits rotation of the shaft 166 in a manner as hereinbefore described. Coupled to this shaft 166 is an internal track cam 708 engaged by a follower 710 coupled to an arm 712 pivoted about a fulcrum pin 714, all as shown best in FIGURE 24 of the drawings. The arm 712 is provided with a gear portion 716 meshed with a pinion 718 disposed to drive a film drive roller 720. The pinion 718 is provided with an overrunning clutch disposed to drive the roller 720 in one direction and to overrun in the opposite direction so that when the gear portion 716 is moved in the direction of an arrow 722 the roller 720 is driven to carry the film in a direction of the arrow 578. And when the lever moves in the direction of an arrow 724, the pinion 718 operates a free running clutch which does not drive the roller 720.

The axle of the roller 720 is stationarily mounted between the side members 576 and 578 of the frame 526, hereinbefore described. The disclosure FIGURE 4 being diagrammatic with respect to the actual rotational mounting of the roller 720 and stationary in relationship with the frame 526.

The fulcrum pin 714 is supported on a bracket 726 which is movable axially in a direction of a lead screw 728. The arm 712 is provided with a bearing slot 730 so that the fulcrum pin 714 may be traversed longitudinally therein in accordance with operation of the screw 728.

The screw 728 is maintained in an axially fixed position by a suitable thrust bearing in connection with the frame of the machine so that a manually operable knob 732 may be rotated to adjust the fulcrum pin 714 longitudinally of the lever 712 to compensate for various magnification ratios afforded by the lenses 158 and 160 in their vertical adjusted position as hereinbefore described; further, finite adjustments of the film drive ration may be made further by the rotation of the knob 732 to compensate for bad character combinations or various justification requirements.

This modification as shown in FIGURE 24 of the drawings provides for semi-manual operation of the machine in the absence of a completely automatic system as disclosed in FIGURE 33 or FIGURE 34, hereinbefore described.

In all modifications and versions of the machine, the console, as shown in FIGURE 1 of the drawings, may be provided with various control features hereinbefore described wherein panels 734 and 736 may contain lines of type of various styles or fonts, and these panels 734 and 736 may have light emitting strips behind them illuminated by lamps which are controlled in accordance with the longitudinal or axially adjusted position of the drum assembly 82 to indicate various font or styles of type aligned with the optical system and ready for exposure through the opening 154 to the film 162.

Reference is now made to FIGURE 10 of the drawings wherein a microswitch 738 is provided to correspond with each of the notches 410 hereinbefore described, each microswitch 738 being provided with a plunger 740 extending upwardly in one of the notches 410 and being engageable by the ball detent 408 so that each switch 738 may be closed to energize a respective lamp behind one of the panels 734 or 736 to indicate the font or type style to which the drum 82 is indexed with respect to the optical system so that the characters 104 of the particular font or type style may be predetermined by the operator of the machine in accordance with proposed copy held on the copy space area 742 of the console of the machine, as shown in FIGURE 1 of the drawings.

It will be obvious to those skilled in the art that various modifications of the invention may be resorted to in a manner limited only by a just interpretation of the following claims.

We claim:

1. In a photo composing machine the combination of: a frame; a hollow circular in cross-section cylindrical drum assembly rotatable concentrically of its circular cross-section and movable axially relative to said frame; a light source supported stationarily relative to said frame and disposed adjacent said hollow drum assembly; a plurality of circular character supporting light transmitting portions on said drum; each character supporting adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; a substantially annular structure having an annular row of irregular portions comprising alternate projections and recesses, said irregular portions carried by said drum assembly; means indexing each one of said irregular portions with one of said character supporting portions; said irregular portions corresponding in magnitude with the required film movement distances with respect to characters on one of said character supporting portions; second means engageable with said irregular portions; a potentiometer operable by said second means and power operated means responsive to said potentiometer, whereby said power operated means is responsive to the magnitude of one of said irregular portions for operating said first means a predetermined amount to move said film a proper distance so that each character photographically reproduced thereon will be properly spaced relative to adjacent photographically reproduced characters.

2. In a photo composing machine the combination of: a frame; a hollow circular in cross-section cylindrical drum assembly rotatable concentrically of its circular cross-section and movable axially relative to said frame; a light source supported stationarily relative to said frame and disposed internally of said hollow drum assembly; a plurality of circular character supporting light transmitting portions on said drum; each character supporting portion adjacent the next character supporting portion longitudinally of the axis of said drum assembly; photographic means outwardly of said drum and disposed to receive shadow images of characters by projection of light from said source internally of said drum and through said light transmitting character supporting portions; first means for moving film relative to said photographic means; a substantially annular structure having an annular row of irregular portions comprising alternate projections and recesses, said irregular portions carried by said drum assembly; means indexing one of said irregular portions; means indexing one of said irregular portions with each of said character supporting portions; said irregular portions corresponding in magnitude with the required film movement distances with respect to characters on one of said character supporting portions; and second means responsive to the magnitude of one of said irregularities; mechanical motion amplifying means of said second means disposed mechanically to engage said irregular portions and to provide large mechanical movement distinctions between the mechanical magnitudes of said irregular portions; a potentiometer responsive to said mechanical motion amplifying means; and power operated means controlled by said potentiometer for operating said first means a predetermined amount to move said film a proper distance so that each character photographically reproduced thereon will be properly spaced on said film relative to adjacent photographically reproduced characters.

3. In a photo composing machine the combination of: a frame; a hollow circular in cross-section cylindrical drum assembly rotatable concentrically of its circular cross-section and movable axially relative to said frame; a light source supported stationarily relative to said frame and disposed adjacent said hollow drum assembly; a plurality of circular character supporting light transmitting portions on said drum having a plurality of characters thereon; each character supporting portion adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; a substantially annular structure having an annular row of irregular portions comprising alternate recesses and projections, said irregular portions carried by said drum assembly; means indexing one of said irregular portions with each of said character supporting portions; said irregular portions corresponding in magnitude with the required film movement distances with respect to characters on one of said characters supporting portions; and second means responsive to the magnitude of one of said irregular portions for operating said first means a predetermined amount to move said film a proper distance so that each character photographically reproduced thereon will be properly spaced relative to adjacent photographically reproduced characters; means for rotating said drum to align one of said characters on one of said character supporting portions with said photographic means comprising a keyboard having a plurality of keys corresponding with said characters; a switch coupled to each of said keys; circuitry having a fixed resistance corresponding with said keys; a motor coupled to said circuitry and mechanically coupled to said drum assembly for rotating it; a position potentiometer rotatably coupled to said motor and said drum and rotatable in unison with and correspondingly with said characters; and means of said circuitry disposed to compare a resistance coupled to one of said key switches and a resistance of said position potentiometer for predetermining a rotary angular position of said drum; and a brake coupled with said motor and said drum for stopping said drum precisely in a position at which a predetermined relationship between the key resistance and the position potentiometer resistance occurs.

4. In a photo composing machine the combination of: a frame; a hollow circular in cross-section cylindrical drum assembly rotatable concentrically of its circular cross-section and movable axially relative to said frame; a light source supported stationarily relative to said frame and disposed adjacent said hollow drum assembly; a plurality of circular character supporting light transmitting portions on said drum having a plurality of characters thereon; each character supporting portion adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; a substantially annular structure having an annular row of irregular portions comprising alternate recesses and projections, said irregular portions carried by said drum assembly; means indexing one of said irregular portions with each of said character supporting portions; said irregular portions corresponding in magnitude with the required film movement distances with respect to characters on one of said character supporting portions; and second means responsive to the magnitude of one of said irregular portions for operating said first means a predetermined amount to move said film a proper distance so that each character photographically reproduced thereon will be properly spaced relative to adjacent photographically reproduced characters; means for rotating said drum to align one of said characters on one of said character supporting portions with said photographic means comprising a keyboard having a plurality of keys corresponding with said characters; a switch coupled to each of said keys; circuitry having a fixed resistance corresponding with each of said keys; a motor coupled to said circuitry and mechanically coupled to said drum assembly for rotating it; a position potentiometer rotatably coupled to said motor and said drum and rotatable in unison with and correspondingly with said characters; and means of said circuitry disposed to compare a resistance coupled to one of said key switches and a resistance of said position potentiometer for predetermining a rotary angular position of said drum; and a brake coupled with said motor and said drum for stopping said drum precisely in a position at which a predetermined relationship between the key resistance and the position potentiometer resistance occurs; a coded switch rotatably coupled to said drum and said motor and having switch elements related to the disposition of said characters; means of said circuitry responsive to said coded switch for rotating said motor in either direction in order to rotate said drum from one character position to another, whichever direction is the shortest rotary movement of the drum assembly.

5. In a photo composing machine the combination of: a frame; a hollow circular in cross-section cylindrical drum assembly rotatable concentrically of its circular cross-section and movable axially relative to said frame; a light source supported stationarily relative to said frame and disposed adjacent said hollow drum assembly; a plurality of circular character supporting light transmtting portions on said drum having a plurality of characters thereon: each character supporting portion adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; a substantially annular structure having an annular row of irregular portions comprising alternate recesses and projections, said irregular portions carried by said drum assembly; means indexing one of said irregular portions with each of said character supporting portions; said irregular portions corresponding in magnitude with the required film movement distances with respect to characters on one of said character supporting portions; and second means responsive to the magnitude of one of said irregular portions for operating said first means a predetermined amount to move said film a proper distance so that each character photographically reproduced thereon will be properly spaced relative to adjacent photographically reproduced characters; means for rotating said drum to align one of said characters on one of said character supporting portions with said photographic means comprising keyboard having a plurality of keys corresponding with said characters; a switch coupled to each of said keys; circuitry having a fixed resistance corresponding with each of said keys; a motor coupled to said circuitry and mechanically coupled to said drum assembly for rotating it; a position potentiometer rotatably coupled to said motor and said drum and rotatable in unison with and correspondingly with said characters;

and means of said circuitry disposed to compare a resistance coupled to one of said key switches and a resistance of said position potentiometer for predetermining a rotary angular position of said drum; and a brake coupled with said motor and said drum for stopping said drum precisely in a position at which a predetermined relationship between the key resistance and the position potentiometer resistance occurs; a coded switch rotatably coupled to said drum and said motor and having switch elements related to the disposition of said characters; means of said circuitry responsive to said coded switch for rotating said motor in either direction in order to rotate said drum from one character position to another, whichever direction is the shortest rotary movement of the drum assembly; a selection logic circuitry coupled to said keyboard switches and said coded switch and disposed to provide an output proportional to bad character combinations requiring a variation of film movement with respect to said irregularities; a mixer disposed to receive an output from said selection logic circuitry; a variable resistance means of said second means having an output coupled to said mixer; magnification means of said photographic means; variable resistance means coupled to said magnification means operating in a ratio with respect to the ratio of magnification, said magnification means having an output coupled to said mixer; further variable resistance means manually operable to provide for type justification having an output coupled to said mixer; said mixer comprising circuitary disposed to provide an output pulse of a duration which is a composite of the functions of the keyboard, the coded switch and all of said variable resistances; a pulse gate coupled to the output of said mixer; a pulse generator adapted to feed high frequency pulses through said pulse gate; said pulse gate having an output; an accumulator substractor circuitry coupled to the output of said pulse gate; a film drive motor disposed to drive said film; digital pickoff means operable in correspondence with the driving of said film and having an output to said accumulator substractor circuitry for substracting pulses feed thereto through said pulse gate; and a motor stop relay operable by said accumulator substractor circuitry and disposed to control said film drive motor; and a motor start relay coupled to said keyboard for initially starting said motor.

6. In a photo composing machine the combination of: a frame; a hollow circular in cross-section cylindrical drum assembly rotatable concentrically of its circular cross-section and movable axially relative to said frame; a light source supported stationarily relative to said frame and disposed adjacent said hollow drum assembly; a plurality of circular character supporting light transmitting portions of said drum; each character supporting portion adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; a substantially annular structure having an annular row of irregular portions comprising alternate projections and recesses, said irregular portions carried by said drum assembly; means indexing each one of said irregular portions with one of said character supporting portions; said irregular portions corresponding in magnitude with the required film movement distances with respect to characters on one of said character supporting portions; second means engageable with said irregular portions, a potentiometer operable by said second means and power operated means responsive to said potentiometer, whereby said power operated means is responsive to the magnitude of one of said irregular portions for operating said first means a predetermined amount to move said film a proper distance so that each character photographically reproduced thereon will be properly spaced relative to adjacent photographically reproduced characters; said power operated means comprising a film drive motor, keyboard switches corresponding to said characters, a coded switch having switch portions directly related to said characters; a selection logic circuitry disposed to receive outputs from said keyboard switches and said coded switch and coupled to a mixer; said selection logic circuitry having an output; a mixer circuitry coupled to said output of said selection logic circuitry; an output from said potentiometer coupled to said mixer circuit; an optical magnification means for said photographic means; a variable resistance coupled to said magnification means and operable in ratio with respect to the ratio of magnification; an output from the variable resistance means coupled to said magnification means and coupled to said mixer, further resistance means manually operable as a justification means having an output coupled to said mixer; an output for said mixer adapted to carry a pulse of a duration comparable to the composite of the signals from said keyboard, said coded switch, said potentiometer and said variable resistances, a pulse gate circuit coupled to the output of said mixer; a pulse generator adapted to generate high frequency pulses to pass through said pulse gate; an output for said pulse gate; an accumulator subtractor circuitary coupled to the output of said pulse gate; said power operated means comprising a film drive motor, a motor start relay coupled to said keyboard adapted to initiate operation of said film drive motor; digital pickoff means coupled to said film drive motor and having an output to said accumulator subtractor circuitry adapted to subtract from the pulses fed thereinto by said pulse generator; and a motor stop relay coupled to said accumulator substractor circuitry to stop said film drive motor when the number of pulses from said pulse generator, as controlled by the pulse from said mixer, are subtracted by operation of said digital pickoff means.

7. In a photo composing machine the combination of: a frame; a hollow circular-in-cross-section cylindrical drum assembly rotatable concentrically of its circular cross-section and movable axially relative to said frame; a light source supported stationarily relative to said frame and disposed adjacent said hollow drum assembly; a plurality of circular character supporting light transmitting portions of said drum; each character supporting portion adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; substantially annular structure having an annular row of irregular portions comprising alternate projections and recesses, said irregular portions carried by said drum assembly; means indexing one of said irregular portions with one of said character supporting portions; said irregular portions corresponding in magnitude with the required film movement distances with respect to characters on one of said character supporting portions; second means engageable with said irregular portions; a potentiometer operable by said second means and power operated means responsive to said potentiometer, whereby said power operated means is responsive to the magnitude of one of said irregular portions for operating said first means a predetermined amount to move said film a proper distance so that each character photographically reproduced thereon will be properly spaced relative to adjacent photographically reproduced characters; said power operated means comprising a keyboard having switches corresponding with said characters; each switch having a fixed resistance output; a coded switch having switch elements provided with a fixed resistance output individually corresponding with each of said characters; a selection logic circuitry coupled with said keyboard switches and said coded switch; an output from said selection logic circuitry and from said potentiometer coupled together; another variable resistance coupled to said last mentioned output and disposed to be operable manually for type spacing justification; an operational amplifier coupled to an output of said last resistance and to said previously mentioned output; said photographic means having a variable magnification optical system; another variable resistance operable in ratio therewith and having an output coupled to said operational amplifier; an output for said operation amplifier; a comparator coupled to said last mentioned output; a feedback potentiometer coupled to said comparator; a film drive motor coupled to said feedback potentiometer and disposed to drive the same; and a motor stop relay coupled to said comparator and disposed to stop said motor when a corresponding relationship is reached between the output from said feedback potentiometer and the output from said operational amplifier.

8. In a photo composing machine the combination of: a frame; a hollow circular in cross-section cylindrical drum assembly rotatable concentrically of its circular cross-section and movable axially relative to said frame; a light source supported stationarily relative to said frame and disposed adjacent said hollow drum assembly; a plurality of circular character supporting light transmitting portions of said drum having a plurality of characters thereon; each character supporting portion adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; a substantially annular structure having an annular row of irregular portions comprising alternate recesses and projections, said irregular portions carried by said drum assembly; means indexing one of said irregular portions with each of said character supporting portions; said irregular portions corresponding in magnitude with the required film movement distances with respect to characters on one of said character supporting portions; and second means responsive to the magnitude of one of said irregular portions for operating said first means a predetermined amount to move said film a proper distance so that each character photographically reproduced therein will be properly spaced relative to adjacent photographically reproduced characters; means for rotating said drum assembly to selectively dispose one of said characters in alignment with said photographic means; a servomotor coupled to said drum for rotating the same; a position potentiometer coupled to said drum and said servomotor and related to the positions of said characters on said character supporting portions; control circuitry coupled to said position potentiometer and said servomotor; a keyboard having keys corresponding with said characters, each key having a fixed resistance output to said control circuitry whereby said servomotor is disposed to position said drum precisely to align one of said characters with said photographic means when the output from said position potentiometer relative to the fixed resistance output from one of the keys of the keyboard occurs in a predetermined relationship.

9. In a photo composing machine the combination of: a frame; a hollow circular in cross-section cylindrical drum assembly rotatably mounted concentrically of its circular cross-section and movable axially relative to said frame; a central shaft means comprising a first shaft fixed to said frame, a first hollow shaft rotatably mounted concentrically on said first shaft; a second hollow shaft rotatably mounted on said first hollow shaft; longitudinal key means on said second hollow shaft; means of said drum assembly carried by said second shaft and coupled with said key means for rotation and longitudinal sliding movement relative to said second hollow shaft; means for driving said second hollow shaft; a spiral cam coupled to said first hollow shaft; a follower for said cam; means for supporting said follower stationarily on said first mentioned stationary shaft coupled stationarily to said frame; a substantially annular row of internally directed irregular elements carried by said drum assembly; a second follower coupled to said first follower and movable into contact with said irregular elements; said irregular elements of varying magnitude; light transmitting portions of said drum assembly having characters thereon; a light source stationarily supported on said first central shaft disposed to cast light through the light transmitting portions of said drum and to cast an image shadow outwardly of said drum; photographic means disposed outwardly of said drum to receive shadow images of characters by projection of light from said source; means maintaining correspondence of said characters with said irregular elements, said spiral cam disposed to project said second cam follower into engagement with one of said irregular elements and to thereby cause indexing of one of said characters with said photographic means and said light source; and said cam thus also adapted to index the spacing required for each of said characters relative to photographic film; photographic film disposed to operate adjacent said photographic means; means for driving said film; and means coupled to said spiral cam and said first hollow shaft for driving said film a distance proportional to a character image transmitted by said light through said photographic means to said film.

10. In a photo composing machine the combination of a frame; a hollow circular in cross-section cylindrical drum assembly rotatably mounted concentrically of its circular cross-section and movable axially relative to said frame; a central shaft means comprising a first shaft fixed to said frame, a first hollow shaft rotatably mounted concentrically on said first shaft; a second hollow shaft rotatably mounted on said first hollow shaft; longitudinal key means on said second hollow shaft; means of said drum assembly carried by said second shaft and coupled with said key means for rotation and longitudinal sliding movement relative to said second hollow shaft; means for driving said second hollow shaft; a spiral cam coupled to said first hollow shaft; a follower for said cam; means for supporting said follower stationarily on said first mentioned stationary shaft coupled stationarily to said frame; a substantially annular row of internally directed irregular elements carried by said drum assembly; a second follower coupled to said first follower and movable into contact with said irregular elements; said irregular elements of varying magnitude; light transmitting portions of said drum assembly having characters thereon; a light source stationarily supported on said first central shaft disposed to cast light through the light transmitting portions of said drum and to cast an image shadow outwardly of said drum; photographic means disposed outwardly of said drum to receive shadow images of characters by projection of light from said source; means maintaining correspondence of said characters with said irregular elements, said spiral cam disposed to project said second cam follower into engagement with one of said irregular elements and to thereby cause indexing of one of said characters with said photographic means and said light source; and said cam thus also adapted to index the spacing required for each of said characters relative to photographic film; photographic film disposed to operate adjacent said photographic means; means for driving said film; and means coupled to said spiral cam and said first hollow shaft for driving said film a distance proportional to a character image transmitted by said light through said photographic means to said film; said light transmitting portions being annular band shaped structures disposed adjacent to each other longitudinally of the axis of said drum; and means for indexing said drum assembly longitudinally of the axis of said shaft assembly for aligning a particular annular character supporting light transmitting portion of said drum in alignment with said photographic means, whereby any one of said annular light transmitting portions may be aligned with said photographic means so that the operator of the machine may choose various fonts or styles of characters to be exposed to said film by said photographic means.

11. In a photo composing machine the combination of: a frame; a hollow circular in cross-section cylindrical drum assembly rotatably mounted concentrically of its circular cross-section and movable axially relative to said frame; a central shaft means comprising a first shaft fixed to said frame, a first hollow shaft rotatably mounted concentrically on said first shaft; a second hollow shaft rotatably mounted on said first hollow shaft; longitudinal key means on said second hollow shaft; means of said drum assembly carried by said second shaft and coupled with said key means for rotation and longitudinal sliding movement relative to said second hollow shaft; means for driving said second hollow shaft; a spiral cam coupled to said first hollow shaft; a follower for said cam; means for supporting said follower stationarily on said first mentioned stationary shaft coupled stationarily to said frame; a substantially annular row of internally directed irregular elements carried by said drum assembly; a second follower coupled to said first follower and movable into contact with said irregular elements; said irregular elements of varying magnitude; light transmitting portions of said drum assembly having characters thereon; a light source stationarily supported on said first central shaft disposed to cast light through the light transmitting portions of said drum and to cast an image shadow outwardly of said drum; photographic means disposed outwardly of said drum to receive shadow images of characters by projection of light from said source; means maintaining correspondence of said characters with said irregular elements, said spiral cam disposed to project said second cam follower into engagement with one of said irregular elements and to thereby cause indexing of one of said characters with said photographic means and said light source; and said cam thus also adapted to index the spacing required for each of said characters relative to photographic film; photographic film disposed to operate adjacent said photographic means; means for driving said film; and means coupled to said spiral cam and said first hollow shaft for driving said film a distance proportional to a character image transmitted by said light through said photographic means to said film; said light transmitting portions being annular band shaped structures disposed adjacent to each other longitudinally of the axis of said drum; and means for indexing said drum assembly longitudinally of the axis of said shaft assembly for aligning a particular annular character supporting light transmitting portion of said drum in alignment with said photographic means, whereby any one of said annular light transmitting portions may be aligned with said photographic means so that the operator of the machine may choose various fonts or styles of characters to be exposed to said film by said photographic means; said photographic means comprising a magnification means disposed to enlarge the shadow images from said characters on said film.

12. In a photo composing machine the combination of: a frame; a hollow circular in cross section cylindrical drum assembly rotatably mounted concentrically of its circular cross-section and movable axially relative to said frame; a central shaft means comprising a first shaft fixed to said frame, a first hollow shaft rotatably mounted concentrically on said first shaft; a second hollow shaft rotatably mounted on said first hollow shaft; longitudinal key means on said second hollow shaft; means of said drum assembly carried by said second shaft and coupled with said key means for rotation and longitudinal sliding movement relative to said second hollow shaft; means for driving said second hollow shaft; a spiral cam coupled to said first hollow shaft; a follower for said cam; means for supporting said follower stationarily on said first mentioned stationary shaft coupled stationarily to said frame; a substantially annular row of internally directed irregular elements carried by said drum assembly; a second follower coupled to said first follower and movable into contact with said irregular elements; said irregular elements of varying magnitude; light transmitting portions of said drum assembly having characters thereon; a light source stationarily supported on said first central shaft disposed to cast light through the light transmitting portions of said drum and to cast an image shadow outwardly of said drum; photographic means disposed outwardly of said drum to receive shadow images of characters by projection of light from said source; means maintaining correspondence of said characters with said irregular elements, said spiral cam disposed to project said second cam follower into engagement with one of said irregular elements and to thereby cause indexing of one of said characters with said photographic means and said light source; and said cam thus also adapted to index the spacing required for each of said characters relative to photographic film; photographic film disposed to operate adjacent said photographic means; means for driving said film; and means coupled to said spiral cam and said first hollow shaft for driving said film a distance proportional to a character image transmitted by said light through said photographic means to said film; said light transmitting portions being annular band shaped structures disposed adjacent to each other longitudinally of the axis of said drum; and means for indexing said drum assembly longitudinally of the axis of said shaft assembly for aligning a particular annular, character supporting light transmitting portion of said drum in alignment with said photographic means, whereby any one of said annular light transmitting portions may be aligned with said photographic means so that the operator of the machine may choose various fonts or styles of characters to be exposed to said film by said photographic means; said photographic means comprising a magnification means disposed to enlarge the shadow images from said characters on said film; means of said film drive means responsive to adjustment of said photographic enlarging means of said photographic means for varying the drive of said film in proportion to the photographic enlargement function.

13. In a photo composing machine the combination of: a frame; a hollow circular in cross-section cylindrical drum assembly rotatable concentrically of its circular cross-section and movable axially relative to said frame; a light source supported stationarily relative to said frame and disposed adjacent said hollow drum assembly; a plurality of circular character supporting light transmitting portions of said drum having a plurality of characters thereon; each character supporting portion adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; a substantially annular structure having an annular row of irregular portions comprising alternate recesses and projections, said irregular portions carried by said drum assembly; means indexing one of said irregular portions with each of said character supporting portions; said irregular portions corresponding in magnitude with the required film movement distances with respect to characters on one of said character supporting portions; and second means responsive to the magnitude of one of said irregular portions for operating said first means a predetermined amount to move said film a proper distance so that each character photographically reproduced thereon will be properly spaced relative to adjacent photographically reproduced characters; said light transmitting character supporting portions of said drum assembly having annular stepped portions adapted to nest concentrically with each other; and bolts extending parallel to the axis of the drum assembly and clamping all of said light transmitting character supporting portions together.

14. In a photo composing machine the combination of: a frame; a hollow circular in cross-section cylindrical drum assembly rotatable concentrically of its circular cross-section and movable axially relative to said frame; a light source supported stationarily relative to said frame and disposed adjacent said hollow drum assembly; a plurality of circular character supporting light transmitting portions of said drum having a plurality of characters thereon; each character supporting portion adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; a substantially annular structure having an annular row of irregular portions comprising alternate recesses and projections, said irregular portions carried by said drum assembly; means indexing one of said irregular portions with each of said character supporting portions; said irregular portions corresponding in magnitude with the required film movement distances with respect to characters on one of said character supporting portions; and second means responsive to the magnitude of one of said irregular portions for operating said first means a predetermined amount to move said film a proper distance so that each character photographically reproduced thereon will be properly spaced relative to adjacent photographically reproduced characters; said light transmitting character supporting portions of said drum assembly having annular stepped portions adapted to nest concentrically with each other; and bolts extending parallel to the axis of the drum assembly and clamping all of said light transmitting character supporting portions together; an outwardly extending annular rib portion at the periphery of each annular light transmitting character supporting portion of said drum assembly thereby to form channels between which characters on the drum assembly are disposed; said annular rib portions having transversely disposed slotted portions therein all aligned with each other and disposed to receive an indexing member laterally of said annular ribs; means stationarily disposed to support said indexing member whereby axial movement of said drum assembly may be made by traversing said slotted portions of said ribs over said indexing member to locate said indexing member between a pair of respective ribs of adjacent character supporting members to thereby align the indexing member between the ribs and to align an annular row of characters with said photographic means.

15. In a photo composing machine the combination of: a frame; a hollow circular in cross-section cylindrical drum assembly rotatable concentrically of its circular cross-section and movable axially relative to said frame; a light source supported stationarily relative to said frame and disposed adjacent said hollow drum assembly; a plurality of circular character supporting light transmitting portions of said drum having a plurality of characters thereon; each character supporting portion adjacent the next character supporting portion longitudinally of the axis of said drum assembly; photographic means adjacent said drum and disposed to receive shadow images of characters by projection of light from said source through said light transmitting character supporting portions; first means for moving film relative to said photographic means; a substantially annular structure having an annular row of irregular portions comprising alternate recesses and projections, said irregular portions carried by said drum assembly; means indexing one of said irregular portions with each of said character supporting portions; said irregular portions corresponding in magnitude with the required film movement distances with respect to characters on one of said character supporting portions; and second means responsive to the magnitude of one of said irregular portions for operating said first means a predetermined amount to move said film a proper distance so that each character photographically reproduced thereon will be properly spaced relative to adjacent photographically reproduced characters; said light transmitting character supporting portions of said drum assembly having annular stepped portions adapted to nest concentrically with each other; and bolts extending parallel to the axis of the drum assembly and clamping all of said light transmitting character supporting portions together; an outwardly extending annular rib portion at the periphery of each annular light transmitting character supporting portion of said drum assembly thereby to form channels between which characters on the drum assembly are disposed; said annular rib portions having traversely disposed slotted portions therein all aligned with each other and disposed to receive an indexing member laterally of said annular ribs; means stationarily disposed to support said indexing member whereby axial movement of said drum assembly may be made by traversing said slotted portions of said ribs over said indexing member to locate said indexing member between a pair of respective ribs of adjacent character supporting members to thereby align the indexing member between the ribs and to align an annular row of characters with said photographic means; slide bars coupled to said frame, a drum carriage movable on said slide bars in parallel relationship to the axis of said drum assembly; stationary detent means supported by said frame; and complimental detent means supported by said carriage, said detent means having indexing portions aligned with said light transmitting character supporting portions and annular rows of characters thereon, whereby said detent means precisely locate said drum assembly so that any one of said light transmitting characters supporting portions and its annular row of characters is precisely aligned with said photographic means.

16. In a photo composing machine the combination of: a frame; a hollow circular in cross-section cylindrical drum assembly rotatably mounted concentrically of its circular cross-section and movable axially relative to said frame; a central shaft means comprising a first shaft fixed to said frame, a first hollow shaft rotatably mounted concentrically on said first shaft; a second hollow shaft rotatably mounted on said first hollow shaft; longitudinal key means on said second hollow shaft; means of said drum assembly carried by said second shaft and coupled with said key means for rotation and longitudinal sliding movement relative to said second hollow shaft; means for driving said second hollow shaft; a spiral cam coupled to said first hollow shaft; a follower for said cam; means for supporting said follower stationarily on said first mentioned stationary shaft coupled stationarily to said frame; a substantially annular row of internally directed irregular elements carried by said drum assembly; a second follower coupled to said first follower and movable into contact with said irregular elements; said irregular elements of varying magnitude; light transmitting portions of said drum assembly having characters thereon; a light source stationarily supported on said first central shaft disposed to cast light through the light transmitting portions of said drum and to cast an image shadow outwardly of said drum; photographic means disposed outwardly of said drum to receive shadow images of characters by projection of light from said source; means maintaining correspondence of said characters with said irregular elements, said spiral cam disposed to project said second cam follower into engagement with one of said irregular elements and to thereby cause indexing of one of said characters with said photographic means and said light source; and said cam thus also adapted to index the spacing required for each of said characters relative to photographic film; photographic film disposed to operate adjacent said photographic means; means for driving said film; and means coupled to said spiral cam and said first hollow shaft for driving said film a distance proportional to a character image transmitted by said light through said photographic means to said film; a variable drive means coupled to said first hollow shaft and connected to said means for driving said film; said variable drive means comprising a cam driven by said first hollow shaft; a lever operable by said last mentioned cam; a fulcrum for said lever adjustable longitudinally thereof to vary its leverage ratio; an end of said lever disposed to operate said means for driving said film; said means for driving said film comprising a roller having an overrunning clutch therein; a spur gear connected to the overrunning clutch; and a gear portion on one end of said lever in mesh with said spur gear.

References Cited by the Examiner

UNITED STATES PATENTS

| | | | |
|---|---|---|---|
| 1,283,394 | 10/1918 | Bawtree | 95—4.5 |
| 1,553,920 | 9/1925 | Smothers | 95—4.5 |
| 1,893,439 | 1/1933 | Ogden | 95—4.5 |
| 2,298,666 | 10/1942 | Whitelaw | 95—4.5 |
| 2,475,497 | 7/1949 | Harrold | 95—4.5 |
| 2,742,830 | 4/1956 | Wirtz | 95—4.5 |
| 2,887,936 | 5/1959 | Spievak | 95—4.5 |
| 2,896,523 | 7/1959 | Tansel | 95—4.5 |
| 2,985,081 | 5/1961 | Jacomelli | 95—4.5 |

JOHN M. HORAN, *Primary Examiner.*